(12) United States Patent
Belinky et al.

(10) Patent No.: US 11,577,561 B2
(45) Date of Patent: Feb. 14, 2023

(54) TOWBAR WITH A HITCH BALL SYSTEM

(71) Applicant: HORIZON GLOBAL (SOUTH AFRICA) (PTY) LTD, Gauteng (ZA)

(72) Inventors: Jacob Belinky, Carleton, MI (US); Johann Willem Strydom, Pretoria (ZA); Marthinus Samuel Labuschagne, Brits (ZA); Francois Engelbrecht, Pretoria (ZA)

(73) Assignee: HORIZON GLOBAL (SOUTH AFRICA) (PTY) LTD

( * ) Notice: Subject to any disclaimer, the term of this patent is extended or adjusted under 35 U.S.C. 154(b) by 69 days.

(21) Appl. No.: 16/956,310

(22) PCT Filed: Dec. 20, 2018

(86) PCT No.: PCT/US2018/066787
§ 371 (c)(1),
(2) Date: Jun. 19, 2020

(87) PCT Pub. No.: WO2019/126493
PCT Pub. Date: Jun. 27, 2019

(65) Prior Publication Data
US 2020/0324596 A1    Oct. 15, 2020

Related U.S. Application Data

(60) Provisional application No. 62/607,967, filed on Dec. 20, 2017.

(51) Int. Cl.
*B60D 1/54*     (2006.01)
*B60D 1/06*     (2006.01)
(Continued)

(52) U.S. Cl.
CPC ............... *B60D 1/54* (2013.01); *B60D 1/065* (2013.01); *B60D 1/155* (2013.01); *B60D 1/246* (2013.01);
(Continued)

(58) Field of Classification Search
CPC ....................................... B60D 1/54–2001/548
(Continued)

(56) References Cited

U.S. PATENT DOCUMENTS 4,662,647 A    5/1987    Calvert
5,971,418 A    10/1999   Lindenman et al.
(Continued)

FOREIGN PATENT DOCUMENTS

DE    19826618    12/1999
DE    102006045465    12/2007
(Continued)

OTHER PUBLICATIONS

International Search Report and Written Opinion dated Jun. 10, 2019; International Patent Application No. PCT/US2018/066787 filed on Dec. 20, 2018. ISA/US.
(Continued)

*Primary Examiner* — Kevin Hurley
(74) *Attorney, Agent, or Firm* — McDonald Hopkins LLC

(57) ABSTRACT

A towbar with a hitch ball system is shown and described. The towbar with a hitch ball system may include a first bushing member, a second bushing member telescopingly engaged with the first bushing member, the second bushing member including at least one aperture, and a pivoting arm telescopingly engaged with the second bushing member. The towbar with a hitch ball system may also include an engagement device operatively coupled with the second bushing member, the engagement device including a pin member and an electrically-operating device, where the
(Continued)

electrically-operating device generally aligns the pin member with the at least one aperture of the second bushing member.

28 Claims, 22 Drawing Sheets

(51) Int. Cl.
  *B60D 1/155* (2006.01)
  *B60D 1/24* (2006.01)
  *B60D 1/48* (2006.01)
(52) U.S. Cl.
  CPC ........ *B60D 1/485* (2013.01); *B60D 2001/544* (2013.01)
(58) Field of Classification Search
  USPC ........................................ 280/491.1
  See application file for complete search history.

(56) References Cited

U.S. PATENT DOCUMENTS

| | | | |
|---|---|---|---|
| 6,409,201 B1 | 6/2002 | Riehle | |
| 6,502,845 B1 | 1/2003 | Van Vleet | |
| 6,902,181 B1 | 6/2005 | Dye | |
| 8,408,577 B2* | 4/2013 | Works | B60D 1/46 |
| | | | 280/491.1 |
| 8,979,112 B2* | 3/2015 | Weipert | B60D 1/54 |
| | | | 280/491.5 |
| 2003/0214116 A1 | 11/2003 | Rehme | |
| 2005/0167946 A1 | 8/2005 | Rampp | |
| 2010/0127479 A1 | 5/2010 | Weipert et al. | |
| 2012/0217724 A1* | 8/2012 | Works | B60D 1/46 |
| | | | 280/490.1 |
| 2013/0020784 A1* | 1/2013 | Weipert | B60D 1/54 |
| | | | 280/490.1 |
| 2015/0184795 A1 | 7/2015 | Babuska | |

FOREIGN PATENT DOCUMENTS

| | | | |
|---|---|---|---|
| DE | 102006045465 B4 * | 3/2017 | ............... B60D 1/06 |
| EP | 0646482 | 4/1995 | |
| EP | 1084871 | 3/2001 | |
| EP | 1090782 | 4/2001 | |
| EP | 1533149 | 5/2005 | |
| EP | 1902870 | 3/2008 | |
| WO | WO2014190954 | 12/2014 | |
| WO | WO-2020006579 A1 * | 1/2020 | ............... B60S 5/00 |

OTHER PUBLICATIONS

Supplementary European Search Report dated Nov. 15, 2021; European Patent Application No. 18892057.3 filed Jul. 16, 2020.

* cited by examiner

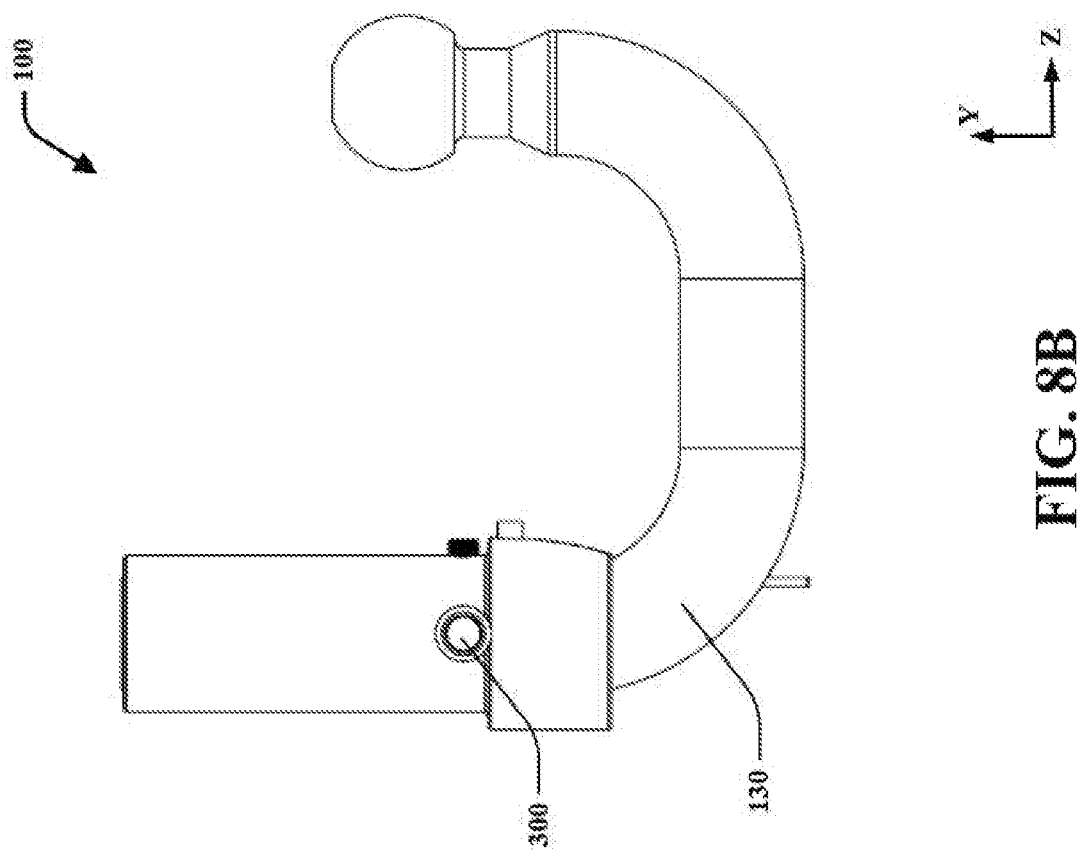
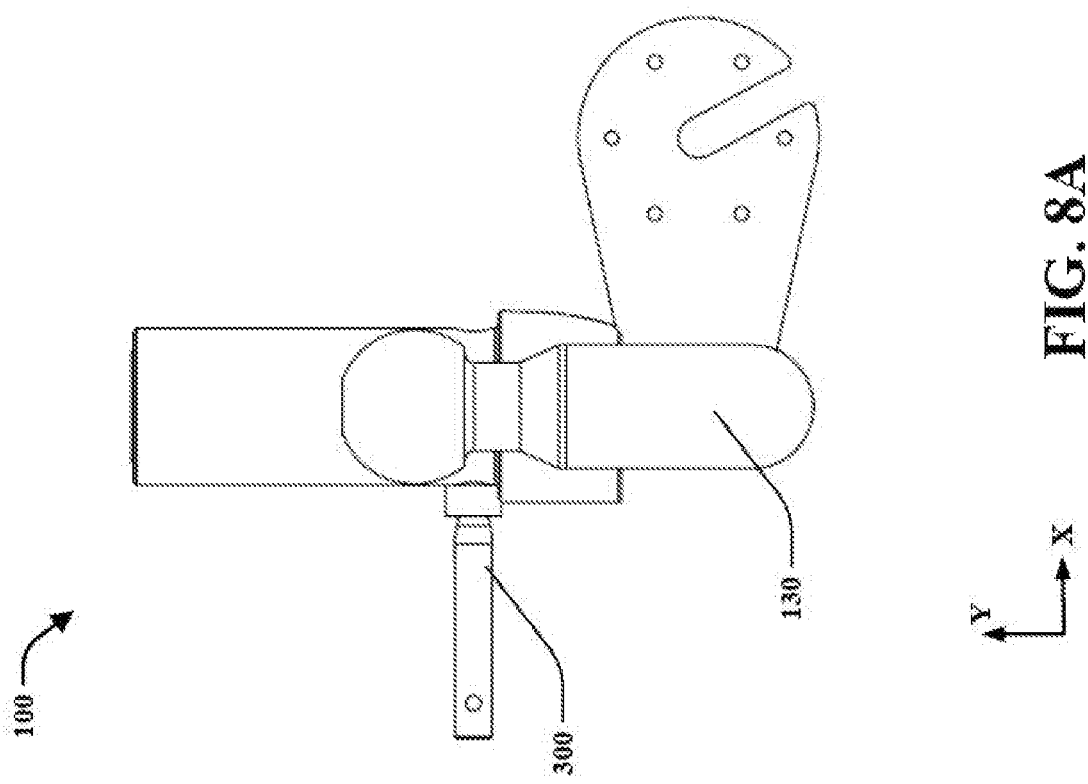
FIG. 8A
FIG. 8B

TOWBAR WITH A HITCH BALL SYSTEM

CROSS-REFERENCE TO RELATED APPLICATION

This application is a 35 U.S.C. § 371 national stage application of PCT Application No. PCT/US2018/066787 filed on Dec. 20, 2018, entitled "TOWBAR WITH A HITCH BALL SYSTEM," which claims priority to U.S. Provisional Patent Application No. 62/607,967 entitled, "TOWBAR WITH A HITCH BALL SYSTEM," filed on Dec. 20, 2017, each of which are incorporated herein by reference in their entireties.

FIELD OF THE INVENTION

The present invention is generally related to a towbar with a hitch ball system incorporating a pivoting arm and, more particularly, to a towbar with a hitch ball system having a telescopic pivoting arm with an electrically-actuating engagement device.

BACKGROUND

A towbar with a hitch ball system is often used in association with towed vehicles, such as trailers. The towbar with a hitch ball system may be utilized to operatively connect a towing vehicle with a towed vehicle. The towed vehicle may include a coupler that operatively engages with the hitch ball of the towbar. This engagement may allow the towing vehicle to tow the towed vehicle. The engagement of the coupler with the hitch ball may allow the towing vehicle to rotate relative to the towed vehicle and vice versa. The coupler and the hitch ball may operatively engage in any appropriate manner.

In some towbar with hitch ball systems, when the hitch ball is not needed such as because no towed vehicle is operatively attached, a user may remove the hitch ball. The one shortcoming to this is that the hitch ball may get displaced and lost. Instead a fold-away system may be utilized to fold-away or rotate the hitch ball portion to an inoperative position, such as under the towing vehicle. This fold-away system may hide the hitch ball from view of the user under the towing vehicle. The fold-away option may require tight mechanical tolerances and it may not be suitable for various types of vehicles because of bumper clearance constraints.

Therefore, there is a need for the towbar with a hitch ball system having a telescopic pivoting arm with an electrically-actuating engagement device that is convenient for the user. There is a need for an engagement device that saves space. There is further a need for socket plate that does not have to be folded away nor handled separately.

SUMMARY

The following presents a summary of this disclosure to provide a basic understanding of some aspects. This summary is intended to neither identify key or critical elements nor define any limitations of embodiments or claims. Furthermore, this summary may provide a simplified overview of some aspects that may be described in greater detail in other portions of this disclosure.

The following description and the drawings disclose various illustrative aspects. Some improvements and novel aspects may be expressly identified, while others may be apparent from the description and drawings.

BRIEF DESCRIPTION OF THE DRAWINGS

Operation of the present teachings may be better understood by reference to the detailed description taken in connection with the following illustrations. These appended drawings form part of this specification, and written information in the drawings should be treated as part of this disclosure. In the drawings:

FIG. 8A is a front view of the embodiment of FIG. 1 in a pin-released towing configuration;

FIG. 8B is a side view of the embodiment of FIG. 1 in the pin-released towing configuration;

DETAILED DESCRIPTION

Figure 1:
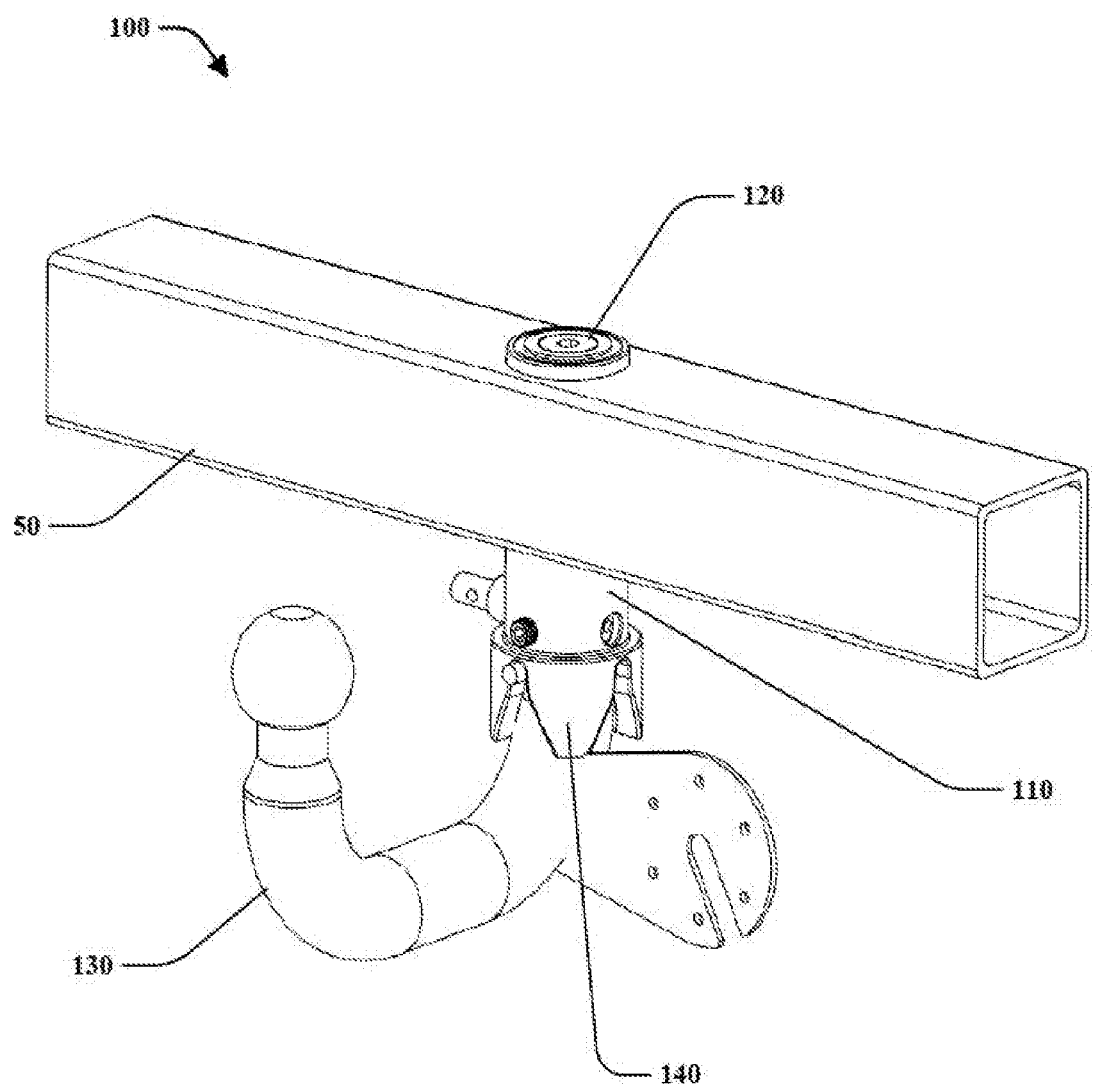
FIG. 1 is a perspective view of a towbar with a hitch ball system incorporating a telescopic pivoting arm and engagement device in a pin-locked towing configuration in accordance with one embodiment of the present disclosure.
Figure 1:
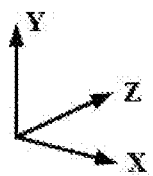

Reference will now be made in detail to exemplary embodiments of the present teachings, examples of which are illustrated in the accompanying drawings. It is to be understood that other embodiments may be utilized and structural and functional changes may be made without departing from the respective scope of the present teachings. As such, the following description is presented by way of illustration only and should not limit in any way the various alternatives and modifications that may be made to the illustrated embodiments and still be within the spirit and scope of the present teachings.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

It is noted that the various embodiments described herein may include other components and/or functionality, such those from other described embodiments herein. It is further noted that while various embodiments refer to a towbar with a hitch ball system, various other systems may be utilized in view of embodiments described herein. Further, the present system may include a variety of components, not limited to the components discussed below. Optionally, the present system may include multiple units of the same components. In an embodiment, the present system may include just the towbar with a hitch ball system described herein. Further, the present system may include components of each of the towbar with a hitch ball system to create a combination of each feature of the various systems. Further still, while the towbar with a hitch ball system is described as being utilized with a towed vehicle, it may also be utilized with a variety of accessories, including, without limitation, a bike rack, a basket or the like. These accessories may attach in any manner, including, without limitation, by selectively attached to the ball of the towbar with hitch ball system. The present teachings contemplate any appropriate use of a towbar with hitch ball system.

A towbar with a hitch ball system is shown and described. The towbar with a hitch ball system may include a first bushing member, a second bushing member telescopingly engaged with the first bushing member, the second bushing member including at least one aperture, and a pivoting arm telescopingly engaged with the second bushing member. The towbar with a hitch ball system may also include an engagement device operatively coupled with the second bushing member, in which the engagement device includes a pin member and an electrically-actuating engagement device. The electrically-actuating engagement device generally aligns the pin member with the at least one aperture of the second bushing member.

A hitch ball system may comprise a first bushing member, a second bushing member telescopingly engaged with the first bushing member, the second bushing member including at least one aperture, a pivoting arm telescopingly engaged with the second bushing member; and an engagement device operatively coupled with the second bushing member, the engagement device including a pin member, wherein the pin member together with the at least one aperture in the second busing member operate to permit different positions of the pivoting arm.

The hitch ball described above may also include any of the following features, elements and/or limitations described below.

The hitch ball system wherein the first bushing member has at least one pair of opposing apertures formed therein and the second bushing member has at least one pair of opposing apertures formed therein, wherein the combination of the aperture pairs in the first bushing member and the second busing member together with the pin member permit locking of the first busing member and the second bushing member so as to prohibit any telescoping between the two bushing members.

The hitch ball system wherein the hitch ball system is operatively engaged to a towbar, the towbar designed to be attached to at least one type of motor vehicle.

The hitch ball system wherein the pivoting arm further comprises at least one socket plate, wherein the socket plate is designed to permit the operative coupling of at least one accessory.

The hitch ball system wherein the socket plate is designed to permit the cooperative connection of a female trailer connector plug.

The hitch ball system wherein the pivoting arm further comprises at least one socket plate, wherein the socket plate is designed to permit the operative coupling of at least one accessory.

The hitch ball system wherein the socket plate is designed to permit the cooperative connection of a female trailer connector plug.

The hitch ball system wherein the first bushing member has at least one pair of opposing apertures formed therein, the second bushing member has at least one pair of opposing apertures formed therein and the pivoting arm has at least one pair of opposing apertures formed therein, wherein the combination of the aperture pairs in the first bushing member, the second busing member and the pivoting arm together with the pin member permit locking of the first busing member, the second bushing member and the pivoting arm so as to prohibit any telescoping between all of the busing members and the pivoting arm of the hitch ball system.

The hitch ball system wherein the hitch ball system is operatively engaged to a towbar, the towbar designed to be attached to at least one type of motor vehicle.

The hitch ball system wherein the pivoting arm further comprises at least one socket plate, wherein the socket plate is designed to permit the operative coupling of at least one accessory.

A hitch ball system of the present disclosure may comprise a inner bushing member, an outer bushing member telescopingly engaged with the first bushing member, a coupler operatively connected to the outer busing member, the coupler including at least two apertures formed therein, a pivoting arm telescopingly engaged with the coupler, and an engagement device operatively coupled with the coupler, the engagement device including a pin member, wherein the pin member together with the at least two apertures in the coupling operate to permit different positions of the pivoting arm.

The hitch ball described above may also include any of the following features, elements and/or limitations described below.

The hitch ball system wherein the first bushing member has at least one pair of opposing apertures formed therein and the second bushing member has at least one pair of opposing apertures formed therein, wherein the combination of the aperture pairs in the first bushing member and the second busing member together with the pin member permit locking of the first busing member and the second bushing member so as to prohibit any telescoping between the two bushing members.

The hitch ball system wherein the hitch ball system is operatively engaged to a towbar, the towbar designed to be attached to at least one type of motor vehicle.

The hitch ball system wherein the pivoting arm further comprises at least one socket plate, wherein the socket plate is designed to permit the operative coupling of at least one accessory.

The hitch ball system wherein the socket plate is designed to permit the cooperative connection of a female trailer connector plug.

The hitch ball system wherein the pivoting arm further comprises at least one socket plate, wherein the socket plate is designed to permit the operative coupling of at least one accessory.

The hitch ball system wherein the socket plate is designed to permit the cooperative connection of a female trailer connector plug.

The hitch ball system wherein the first bushing member has at least one pair of opposing apertures formed therein, the second bushing member has at least one pair of opposing apertures formed therein and the pivoting arm has at least one pair of opposing apertures formed therein, wherein the combination of the aperture pairs in the first bushing member, the second busing member and the pivoting arm together with the pin member permit locking of the first busing member, the second bushing member and the pivoting arm so as to prohibit any telescoping between all of the busing members and the pivoting arm of the hitch ball system.

The hitch ball system wherein the hitch ball system is operatively engaged to a towbar, the towbar designed to be attached to at least one type of motor vehicle.

The hitch ball system wherein the pivoting arm further comprises at least one socket plate, wherein the socket plate is designed to permit the operative coupling of at least one accessory.

A hitch ball system of the present disclosure may comprise an inner bushing member, an outer bushing member telescopingly engaged with the first bushing member, the second bushing member including at least one aperture, a pivoting arm telescopingly engaged with the second bushing member, and an engagement device operatively coupled with the second bushing member, the engagement device including a pin member and an electrically-operating device, wherein the electrically-operating device generally aligns the pin member with the at least one aperture of the second bushing member.

The hitch ball system wherein the first bushing member has at least one pair of opposing apertures formed therein and the second bushing member has at least one pair of opposing apertures formed therein, wherein the combination of the aperture pairs in the first bushing member and the second busing member together with the pin member permit locking of the first busing member and the second bushing member so as to prohibit any telescoping between the two bushing members.

The hitch ball system wherein the hitch ball system is operatively engaged to a towbar, the towbar designed to be attached to at least one type of motor vehicle.

The hitch ball system wherein the pivoting arm further comprises at least one socket plate, wherein the socket plate is designed to permit the operative coupling of at least one accessory.

The hitch ball system wherein the socket plate is designed to permit the cooperative connection of a female trailer connector plug.

The hitch ball system wherein the pivoting arm further comprises at least one socket plate, wherein the socket plate is designed to permit the operative coupling of at least one accessory.

The hitch ball system wherein the socket plate is designed to permit the cooperative connection of a female trailer connector plug.

The hitch ball system wherein the first bushing member has at least one pair of opposing apertures formed therein, the second bushing member has at least one pair of opposing apertures formed therein and the pivoting arm has at least one pair of opposing apertures formed therein, wherein the combination of the aperture pairs in the first bushing member, the second busing member and the pivoting arm together with the pin member permit locking of the first busing member, the second bushing member and the pivoting arm so as to prohibit any telescoping between all of the busing members and the pivoting arm of the hitch ball system.

The hitch ball system wherein the hitch ball system is operatively engaged to a towbar, the towbar designed to be attached to at least one type of motor vehicle.

The hitch ball system wherein the pivoting arm further comprises at least one socket plate, wherein the socket plate is designed to permit the operative coupling of at least one accessory.

The hitch ball system wherein the pivoting arm further comprises a detachable hitch ball, wherein the detachable hitch ball is removably attached to the pivoting arm via at least one engagement pin configured to engage at least one aperture of the detachable hitch ball.

FIG. 1 illustrates a non-limiting exemplary embodiment of a towbar with a hitch ball system 100 as shown and described herein. The towbar 50 may be operatively attached with a towing vehicle (not shown) in any appropriate manner. For example, the towbar 50 may be attached to a frame of the towing vehicle, such as being welded thereto or being attached with fasteners. The present teachings are not limited to any specific configuration. Further still, the towbar 50 may be attached integrally or monolithically formed with the frame of the towing vehicle or be a part of the bumper of the towing vehicle. The towbar with a hitch ball system 100 may be secured to the towbar 50. The towbar with a hitch ball system 100 may be secured by any appropriate means, such as with fasteners, welding or the like. The towbar with a hitch ball system 100 may include an outer bushing 110, an inner bushing 120, a pivoting arm 130 and a coupler 140. The inner bushing 120 may be in a telescoping relationship with or otherwise telescopingly engaged with the outer bushing 110. The pivoting arm 130 may be in telescoping relationship with or otherwise telescopingly engaged with the inner bushing 120. By way of a non-limiting example, the inner bushing 120 may retract within or extend from the outer bushing 110. Likewise, the pivoting arm 130 may retract within and extend from the inner bushing 120. The outer and inner bushings 110, 120 may be of any appropriate shape, such as by way of a non-limiting example, a generally round cross-sectional shape. In some embodiments, the outer and inner bushings 110, 120 may have a generally square, rectangular or other appropriate shape. The outer and inner bushings 110, 120 may be formed from any material, such as metal or plastic, including, without limitation they may be formed of steel.

Figure 2B:
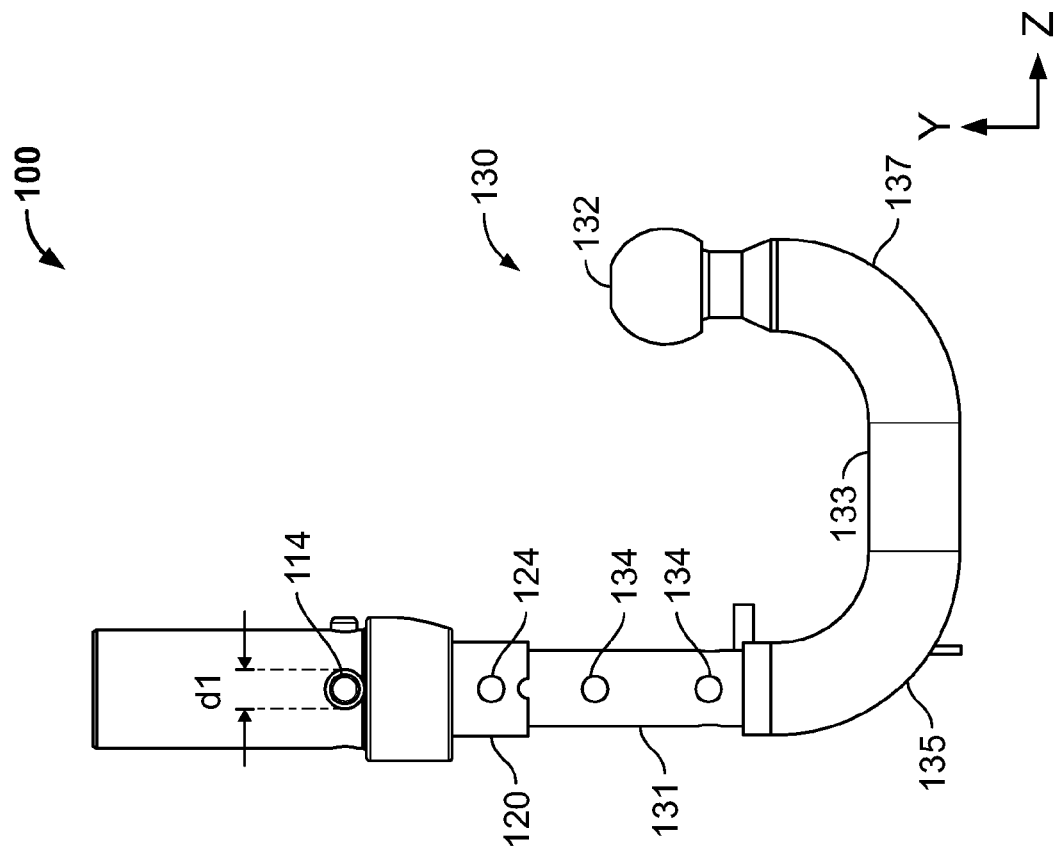
FIG. 2B is a side view of the embodiment of FIG. 1 in the pin-released and dropped configuration.
Figure 2A:
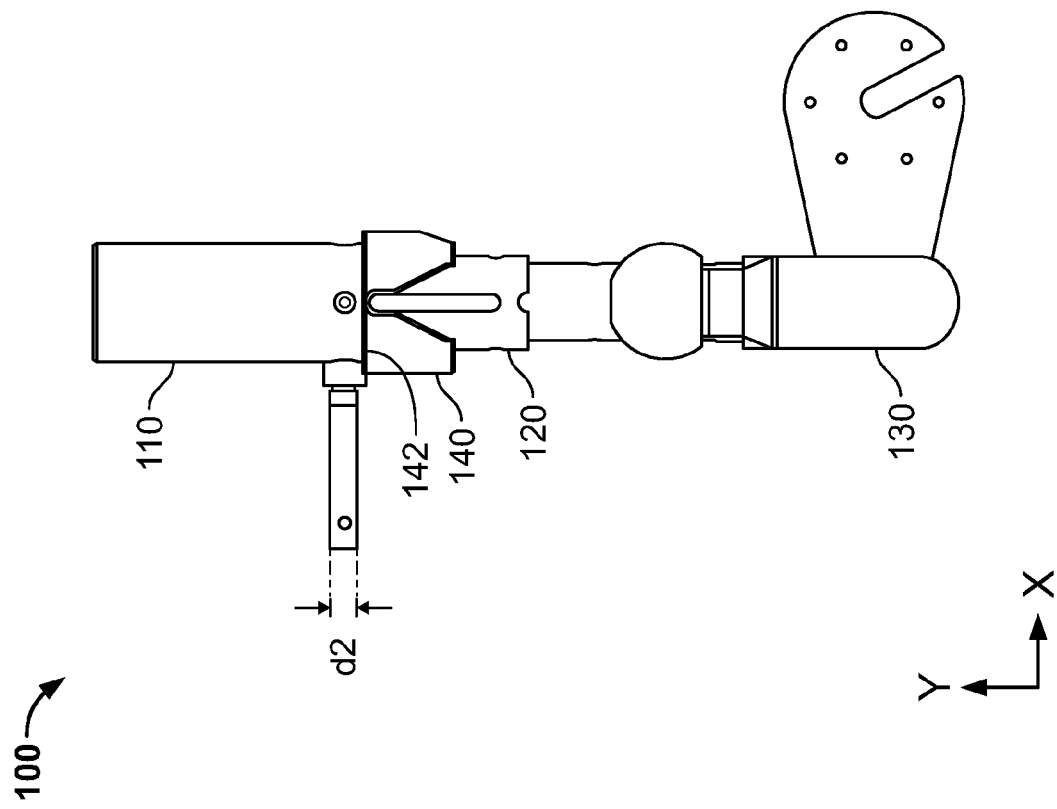
FIG. 2A is a front view of the embodiment of FIG. 1 in a pin-released and dropped configuration.

Referring to FIGS. 2A and 2B, the pivoting arm 130 may include an engaging portion 131, a hitch ball 132, a mid-portion 133 and first and second rounded portions 135, 137. The pivoting arm 130 may be of any appropriate shape, such as a general U-shape whereby it may have two ends extending outwardly from the mid-portion 133. By way of a non-limiting example, the pivoting arm 130 may also be a generally round cross-sectional shape. The present teachings, however, are not limited to this configuration. The hitch ball 132 may be monolithically formed therewith. The hitch ball 132 may be of any appropriate shape, such as generally circular, oval, or the like, so as that it may generally add stability to the pivoting arm 130 of the towbar with a hitch ball system 100. The hitch ball 132 may be configured similar to any current hitch ball. The present teachings are not limited to a specific configuration thereof.

The outer bushing 110 and the pivoting arm 130 may be coupled together by the coupler 140. The coupler 140 may be placed over the outer bushing 110. The coupler 140 may include a coupler aperture 142 through which the pivoting arm 130 may operatively pass (or be inserted therein). The coupler aperture 142 may be of a generally round shape and may be of a size that is similar to the size of an outer diameter of the pivoting arm 130. However, the coupler aperture 142 is not limited to being round. It may also be rectangular, square or any other appropriate shape.

The outer bushing 110 may have an outer diameter that is generally similar to the diameter of the coupler aperture 142 of the coupler 140. The outer diameter of the outer bushing 110 may be of a shape and size that it is configured to be insertable within and through the coupler aperture 142 in the coupler 140. The fit between the outer bushing 110 and coupler aperture 142 is generally tight such that the coupler aperture 142 is just large enough to allow the outer bushing 110 to pass therethrough, but not the pivoting arm 130.

The outer bushing 110 may include a pair of outer apertures 114 on opposing sides. The inner bushing 120 may include a pair of inner apertures 124 on opposing sides. The pair of outer apertures 114 may be aligned with a pair of inner apertures 124 of the inner bushing 120 such that the outer apertures 114 may extend through the inner bushing 120. While a pair of apertures 124 is shown, the inner bushing 120 may include more than the pair of inner apertures 124, i.e., any number of such apertures that provides the appropriate amount of adjustability of the towbar with hitch ball system 100.

A plurality of pairs of arm apertures 134 may be positioned along a portion of the length of the pivoting arm 130. Still further, the plurality of pairs of arm apertures 134 may be positioned on any appropriate portion of the inner bushing 130 and are not limited to be on the sides or limited to be opposed one another. The pivoting arm 130 may be selectively positioned relative to the inner bushing 120 such that one of the plurality of pairs of arm apertures 134 of the pivoting arm 130 may generally align with the pair of inner apertures 124 of the inner bushing 120. In such embodiments, the pivoting arm 130 may be telescopingly positioned relative to the inner bushing 120 to generally align the outer and inner apertures 114 and 124 as required to position the pivoting arm 130 appropriately. It should also be understood that any number of arm apertures 134 may be included, such as two, three, four, five, etc. The appropriate number will depend upon the adjustability desired for the towbar with hitch ball system 100, i.e., the more adjustability desired the more arm apertures 134 will be included.

Figure 3:
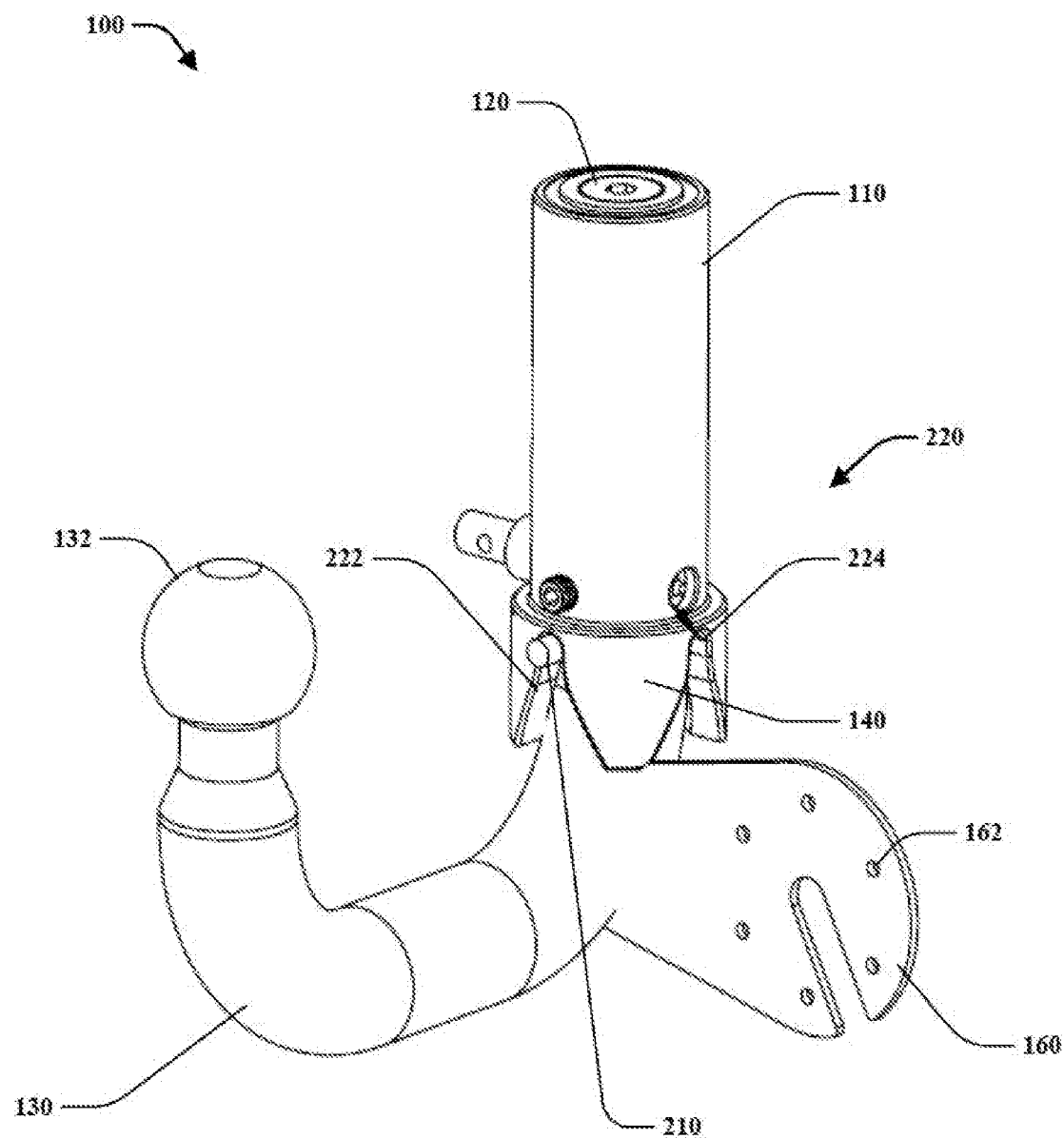
FIG. 3 is a perspective view of the towbar with a hitch ball system incorporating an activating pin and sensor receiving members.

As shown in FIG. 3, the pivoting arm 130 may further include a socket plate 160. The socket plate 160 may by attached with the pivoting arm 130 in any appropriate manner, such as being welded, adhered or fastened. In some embodiments, the socket plate 160 may be monolithically formed with or otherwise attached to the pivoting arm 130, such as through welding or the like. The socket plate 160 may include at least one plate aperture 162 configured to receive an accessory, such as for example an electrical connector, such as by way of a non-limiting example a female trailer connector plug. The at least one plate apertures 162 may be of any appropriate configuration. The at least one plate apertures 162 may be of any appropriate shape and positioned at any appropriate location on the socket plate 160. Further, any appropriate number of plate apertures 162 is contemplated. While six are shown in FIG. 3, the towbar with hitch ball system 100 may include one, two, three, four, five, six, seven, eight, nine, ten or more such plate apertures 162. The present disclosure is not intended to be limited by any specific number of such plate apertures 162.

By way of an exemplary embodiment, the towbar with a hitch ball system 100 may include activating pin 210 and sensor receiving member 220. The towbar with a hitch ball system 100 may include a sensor activating pin 210 that extends from the pivoting arm 130. The sensor activating pin 210 may be of any appropriate configuration and may be formed in any appropriate manner. By way of a non-limiting example, the sensor activating pin 210 may include a pin inserted into the pivoting arm 130. However, the sensor activating pin 210 may be formed in any other appropriate manner. Further, the pivoting arm 130 may include any appropriate number of sensor activating pin 210, e.g., one, two, three, etc.

By way of a non-limiting example, the sensor activating pin 210 and the sensor receiving member 220 may be generally aligned and/or otherwise matingly engaged with one another. Engaging the sensor activating pin 210 and the sensor receiving member 220 may generally activate the sensing device such that the actuating member 310 (shown in FIG. 5) may be performing predetermined actions.

The sensor activating pin 210 may be of any shapes and sizes such that they may operatively mate or engage with the sensor receiving member 220. In some embodiments, the sensor activating pin 210 may be a male member and the sensor receiving member 220 may be a female member such that the sensor activating pin 210 is operatively engageable with the sensor receiving member 220. The present teachings, however, are not limited to this configuration.

The sensor receiving member 220 may include a first and second sensor engagement members 222, 224 attached with or formed in the coupler 140. The first and second sensor engagement members 222, 224 may be of any configuration and may be positioned in any appropriate location, including, without limitation on the sides of the coupler 140. By way of a non-limiting example, the first sensor engagement member 222 may be an aperture or slot formed in the coupler 140 of any appropriate shape and size. As shown in FIG. 3, the first and second sensor engagement members 222, 224 may be of a generally triangular shape, but may be of any appropriate shape, including, without limitation, circular, non-circular, square, polygonal, rectangular, oval or a combination of such.

Figure 4:
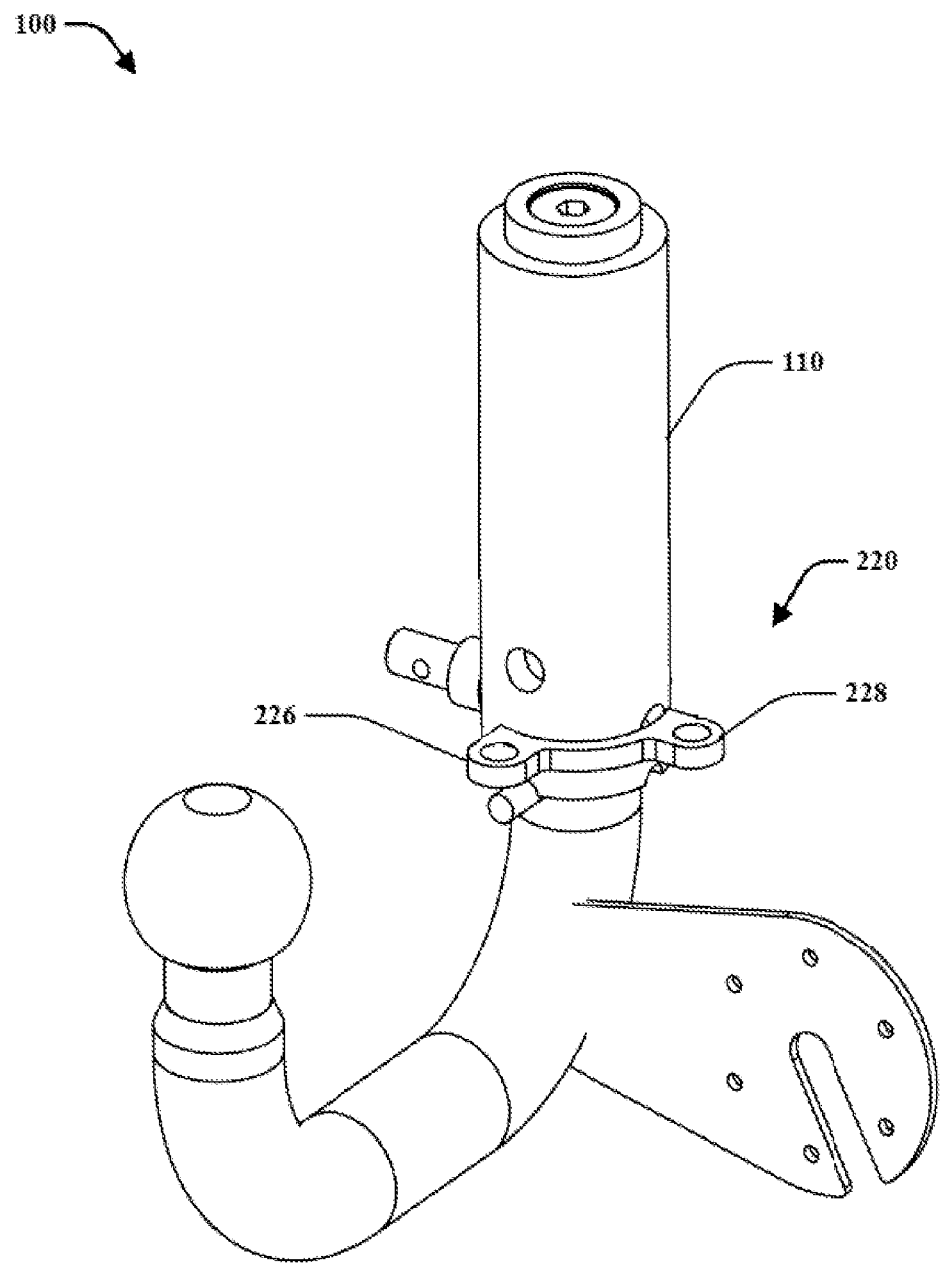
FIG. 4 is a perspective view of alternative embodiment of the towbar with a hitch ball system incorporating an activating pin and sensor receiving members incorporating brackets.

Alternatively, by way of a non-limiting example, the sensor receiving member 220 may include a protruding member or brackets 226, 228 in another embodiment illustrated in FIG. 4. The brackets 226, 228 may be formed in or attached with the outer bushing 110 and may be of any appropriate shape and size. The brackets 226, 228 may be of a generally rectangular shape, but may be of any appropriate shape, including, without limitation, circular, non-circular, square, polygonal, triangular, oval or a combination of such. The brackets 226, 228 may be of any configuration and positioned in any appropriate location, including, without limitation on the outer bushing 110. The brackets 226, 228 may be of a configuration such that it mates with the sensor (not shown). The brackets 226, 228 may help ensure that the sensor is operatively positioned on the outer bushing 110, such as by ensuring that the sensors are positioned appropriately.

Figure 5:
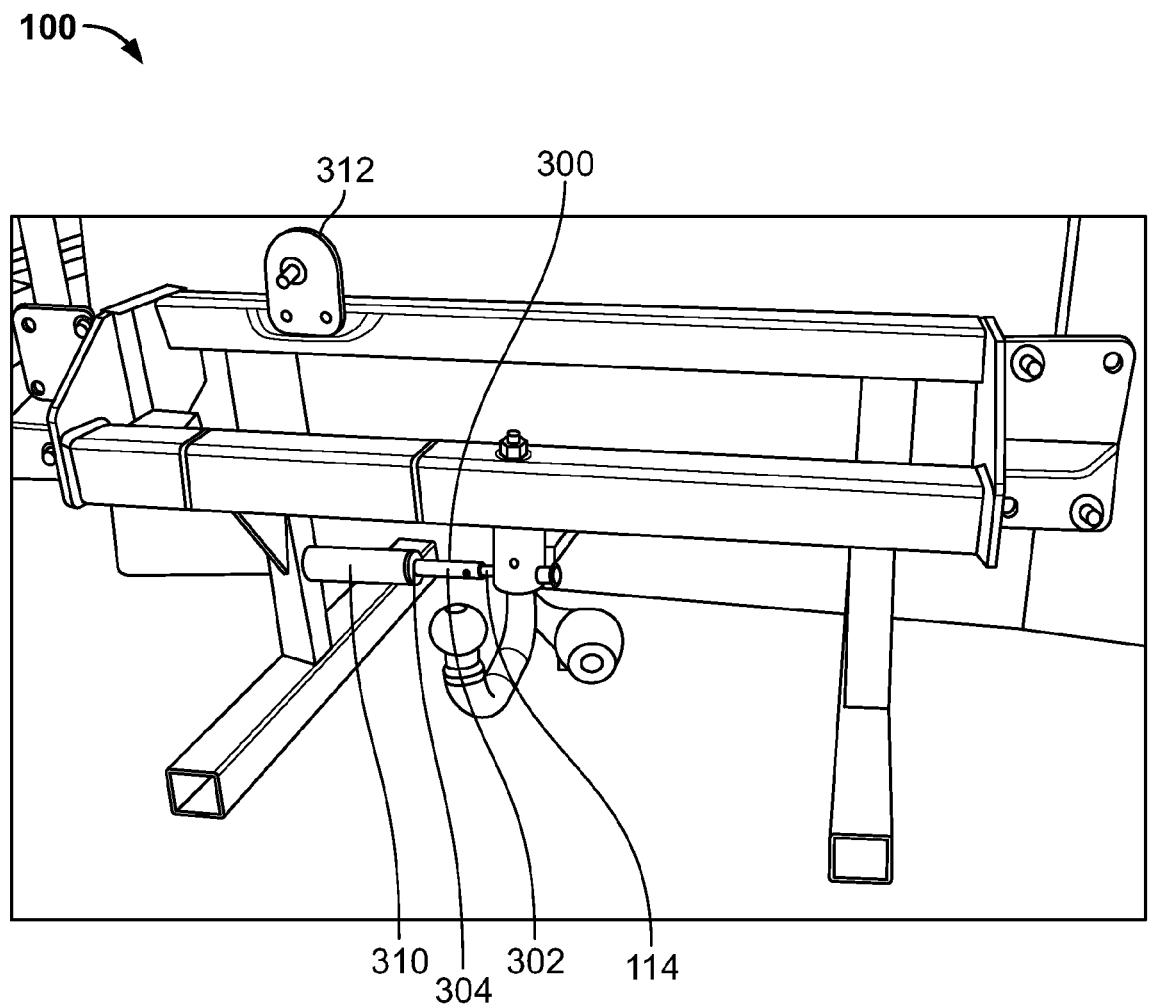
FIG. 5 is an exemplary embodiment of the towbar with a hitch ball system incorporating a telescopic pivoting arm with an electrically-actuating engagement device.

With respect to FIG. 5, the pin member 300 may be generally connected with the actuating member 310 such that portions of the pin member 300 may extend out from the actuating member 310. As shown in FIG. 2B, the pair of outer apertures 114 may include a diameter $d_1$ that is generally larger than an outer diameter $d_2$ of the first portion 302 of the pin member 300 such that the first portion 302 of the pin member 300 may be inserted into and out of the outer aperture 114. Further, the first portion 302 may be of a shape and size such that it is selectively and axially positionable into and out of the apertures 124, 134 of the inner bushing 120 and pivoting arm 130. A second portion 304 of the pin member 300 may extend from the actuating member 310. The second portion 304 may be opposite the first portion 302. The second portion 304 of the pin member 300 may be biased towards an engaged and locked position for securing the pin member 300 into the pin-locked configuration.

Referring back to FIG. 3, the sensor activating pin 210 may be configured to activate the sensor (not shown) to position a pin member 300 shown in FIG. 5 in the engaged and locked position, i.e., with the first portion 302 of the pin member 300 in the apertures 124, 134 of the inner bushing 120 and the pivoting arm 130. Further, the sensor activating pin 210 may be configured to hold the pin member 300 in the disengaged and/or released position, i.e., with the first portion 302 of the pin member 300 out of the apertures 124, 134 of the inner bushing 120 and the pivoting arm 130.

Figure 6:
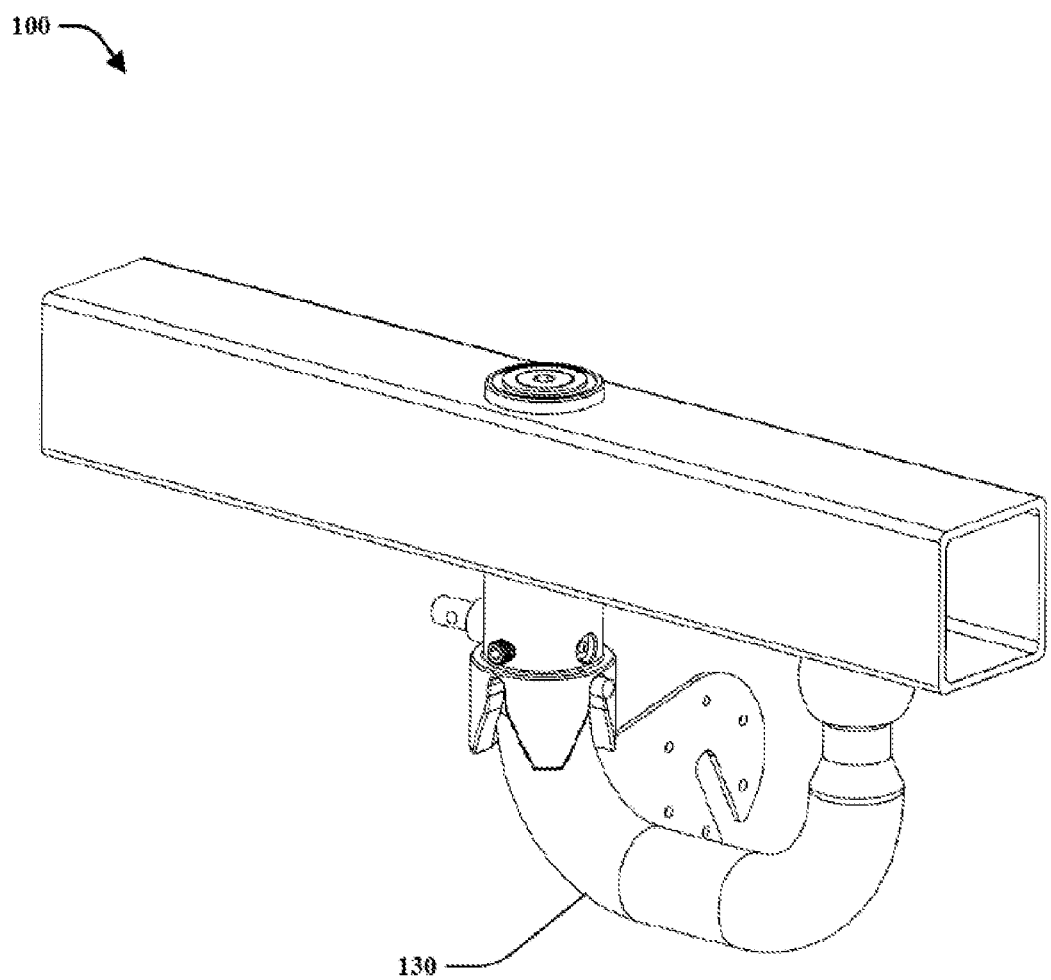
FIG. 6 is a perspective view of the embodiment of FIG. 1 with the telescopic pivoting arm in a fold-away configuration.
Figure 7B:
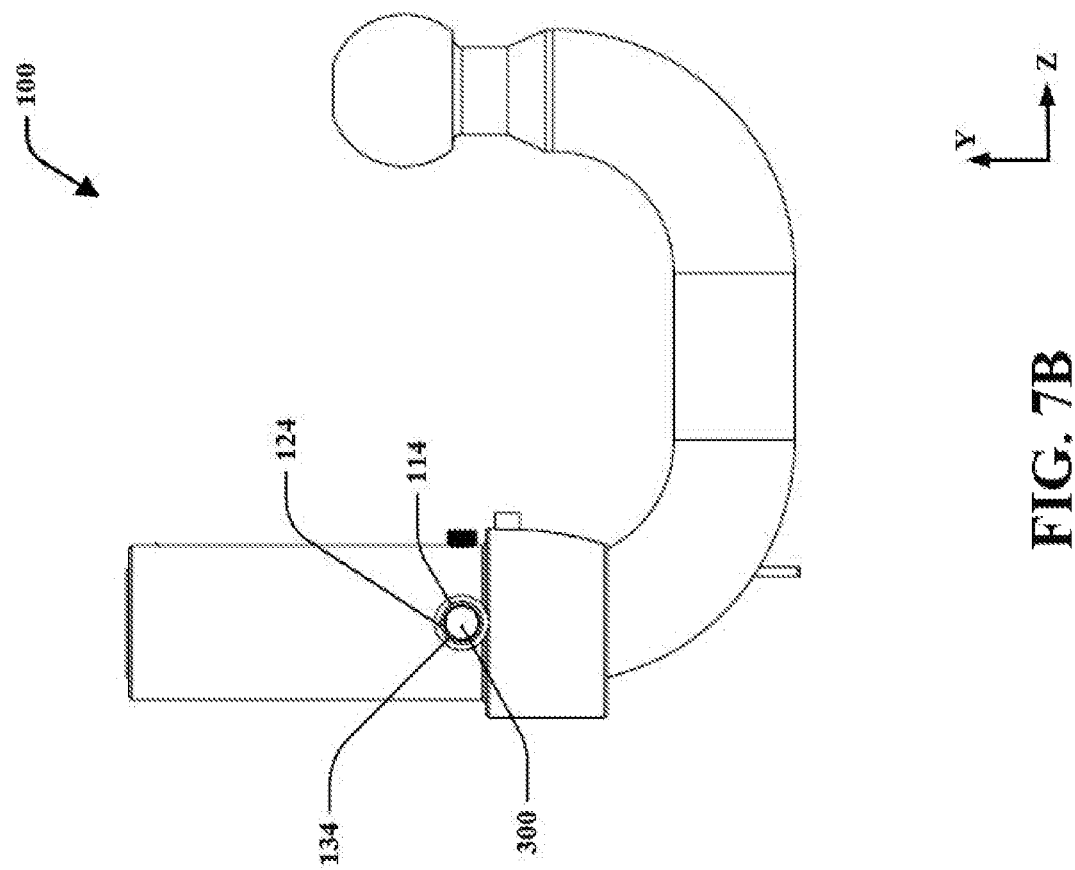
FIG. 7B is a side view of the embodiment of FIG. 1 in the pin-locked towing configuration.
Figure 7A:
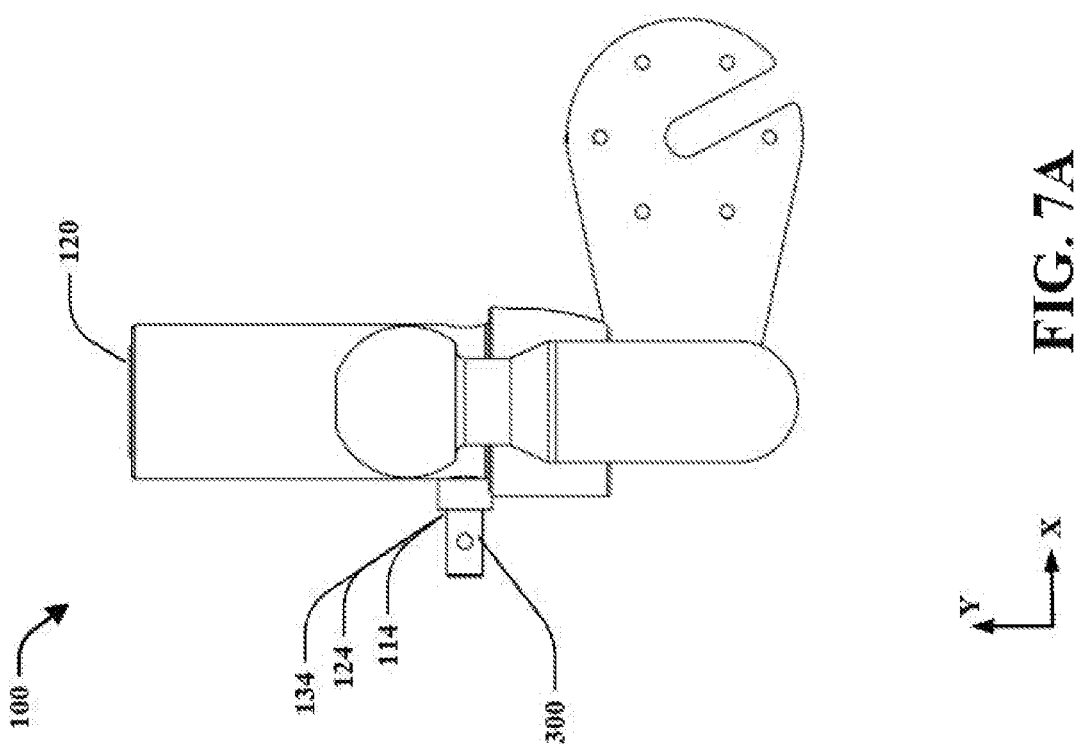
FIG. 7A is a front view of the embodiment of FIG. 1 in a pin-locked towing configuration.
Figure 9B:
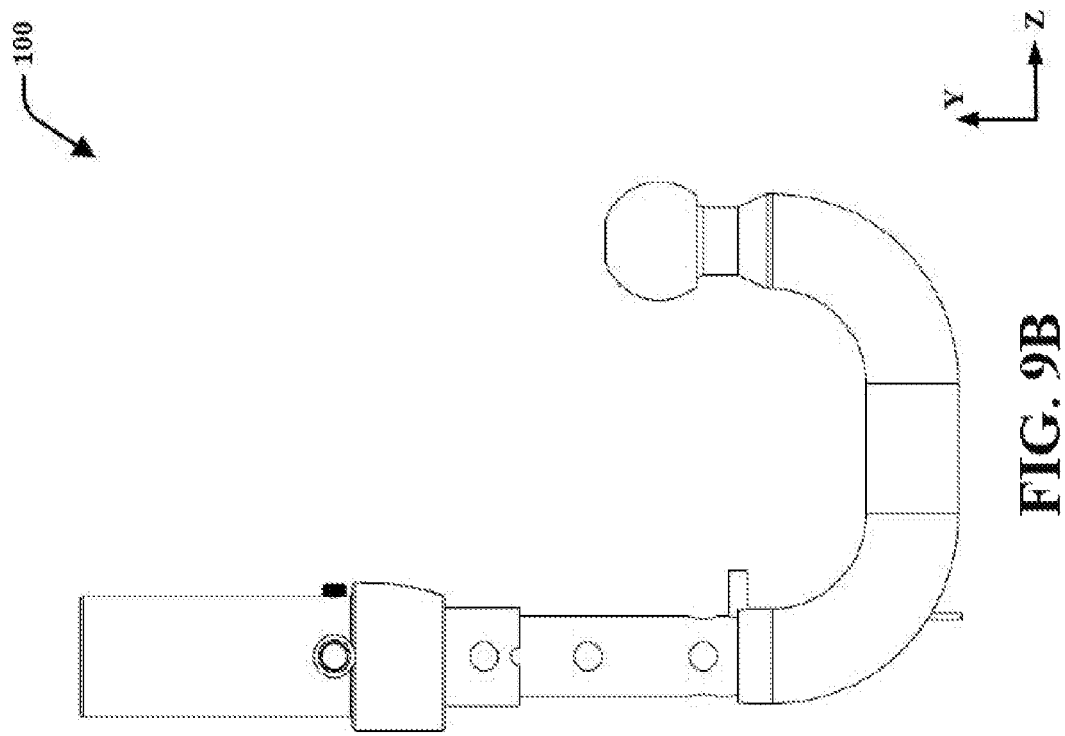
FIG. 9B is a side view of the embodiment of FIG. 1 in the pin-released and dropped configuration.
Figure 9A:
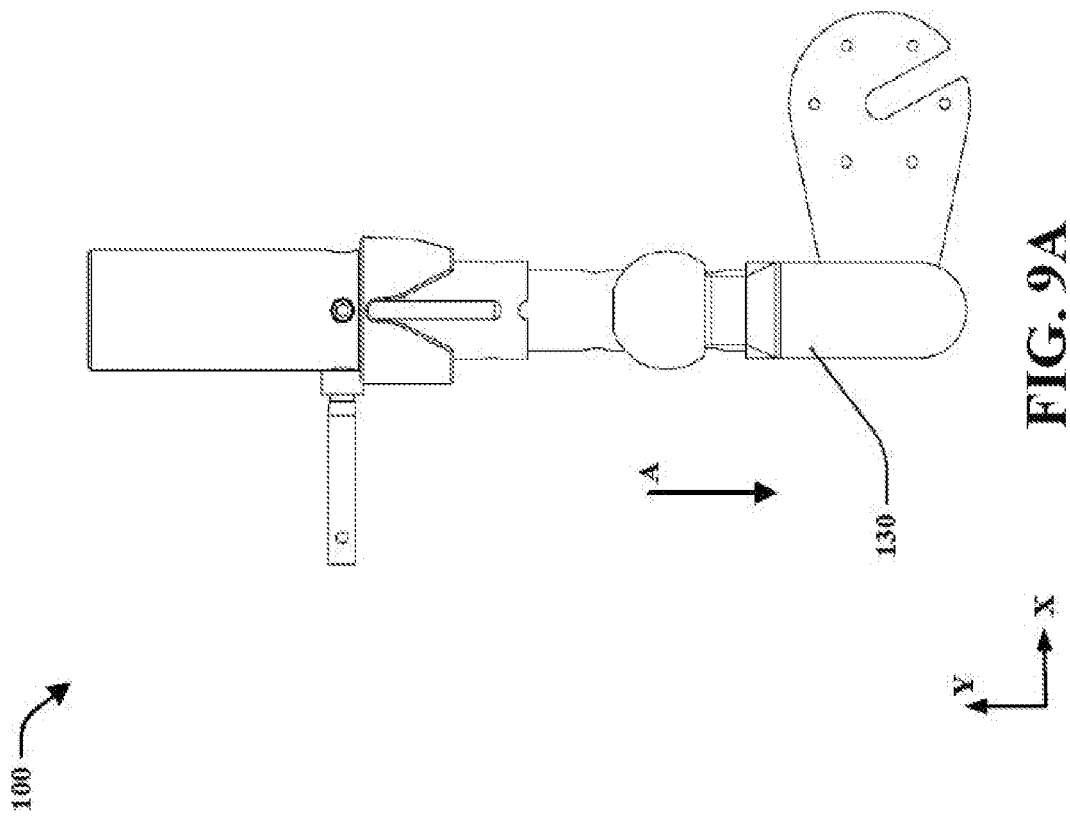
FIG. 9A is a front view of the embodiment of FIG. 1 in a pin-released and dropped configuration.

Disclosed herein the towbar with a hitch ball system 100 is configured to change a position or configuration to and from a towing configuration and a fold-away configuration (underneath the towbar of the towing vehicle). FIG. 6 is a perspective view of the towbar with a hitch ball system 100 incorporating pivoting arm 130 in the fold-away position. In this position, the pivoting arm 130 may be stowed underneath the towbar 50 when not in use. The fold-away position may allow user to place the pivoting arm 130 along various towbars for support thereon. In particular, the pivoting arm 130 may be placed along portions of the underside of a vehicle or as needed by the user.

In operation shown in FIGS. 7A-12B, the pin member 300 may be selectively engaged with and disengaged from the apertures 114, 124, 134. As shown in FIGS. 8A and 8B, the pivoting arm 130 may be disengaged from the inner bushing 120 so that it may travel axially relative to the inner bushing 120 by disengaging the pin member 300. Specifically, the pivoting arm 130 may be telescopingly moved into and/or out of the inner bushing 120 until it is in its dropped position, e.g., until the pivoting arm 130 rotates without interference with the towbar 50. In such embodiments, the pivoting arm 130 may be axially/linearly positioned—such as shown by arrow A in FIG. 9A. As the pivoting arm 130 travels axially into a dropped position shown in FIG. 9B, the pivoting arm 130 may rotate and may be pivotally positioned.

Figure 10B:
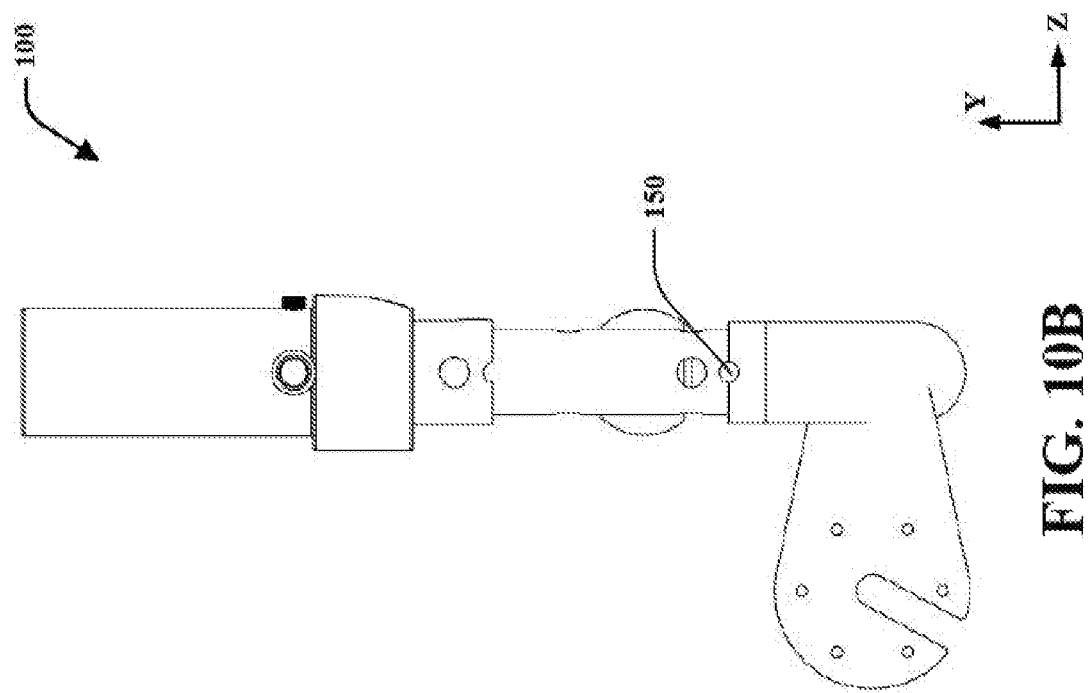
FIG. 10B is a side view of the embodiment of FIG. 1 in the pin-released, dropped and fold-away configuration.
Figure 10A:
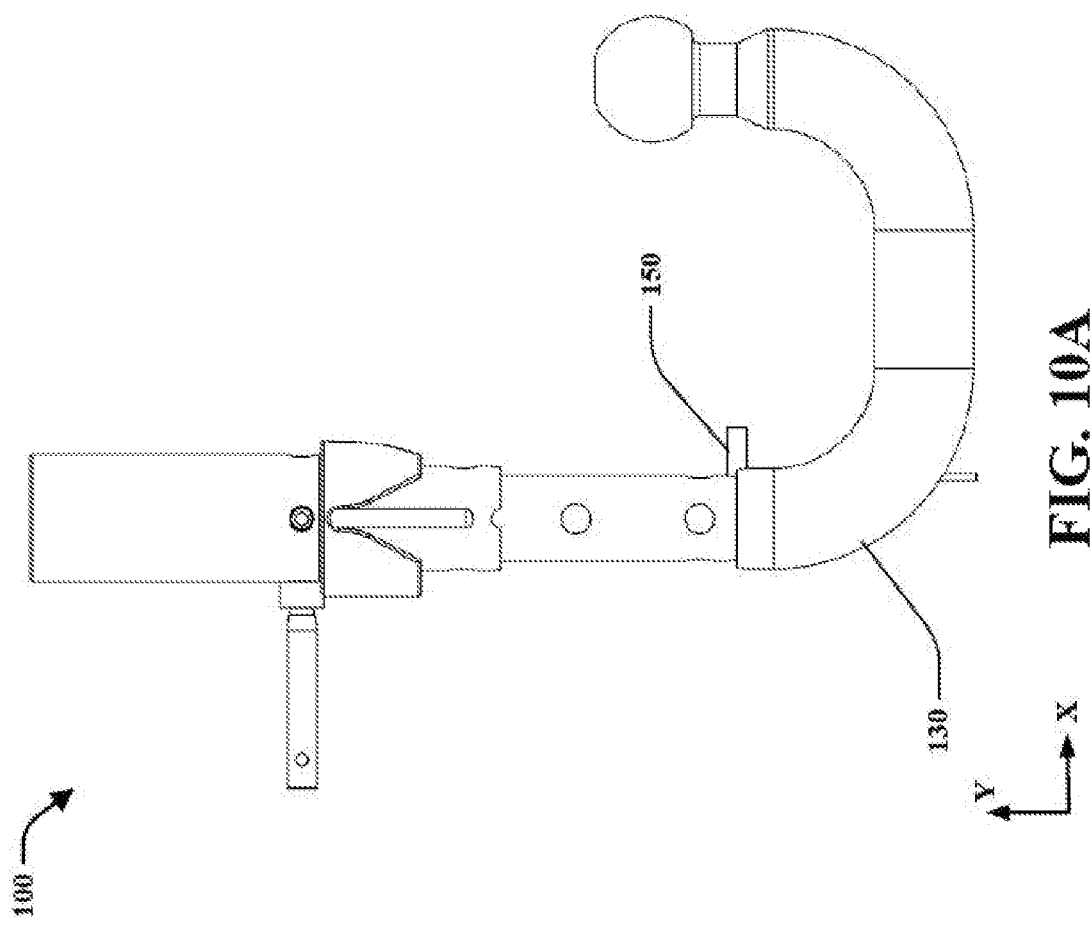
FIG. 10A is a front view of the embodiment of FIG. 1 in a pin-released, dropped and fold-away configuration.

As shown in FIGS. 10A and 10B, the pivoting arm 130 may be rotated until the positioning member 150 engages with an end portion generally preventing the pivoting arm 130 from over passing the predetermined position, such as for example 90 degree. At this time, user may travel the pivoting arm 130 upward until it is in the towing position.

Figure 11B:
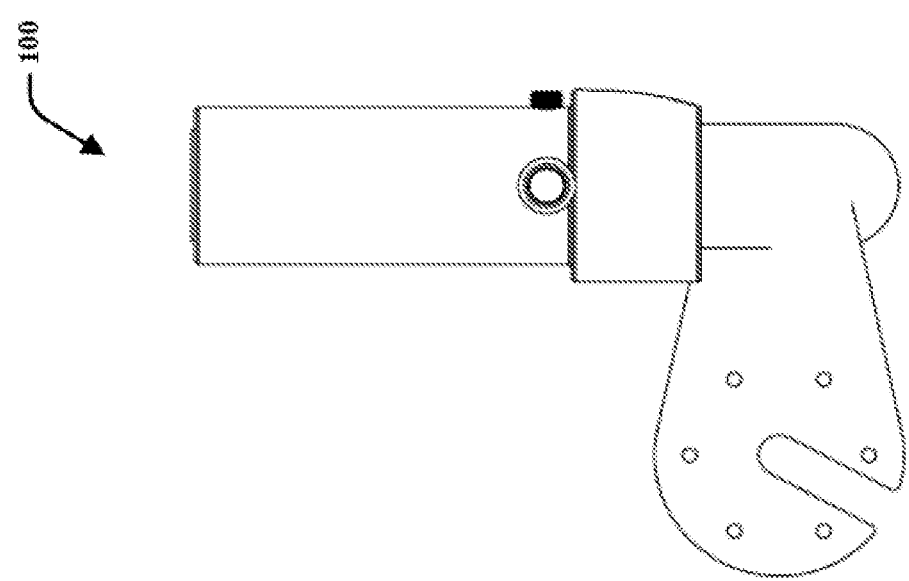
FIG. 11B is a side view of the embodiment of FIG. 1 in the pin-released, towing and fold-away configuration.
Figure 11A:
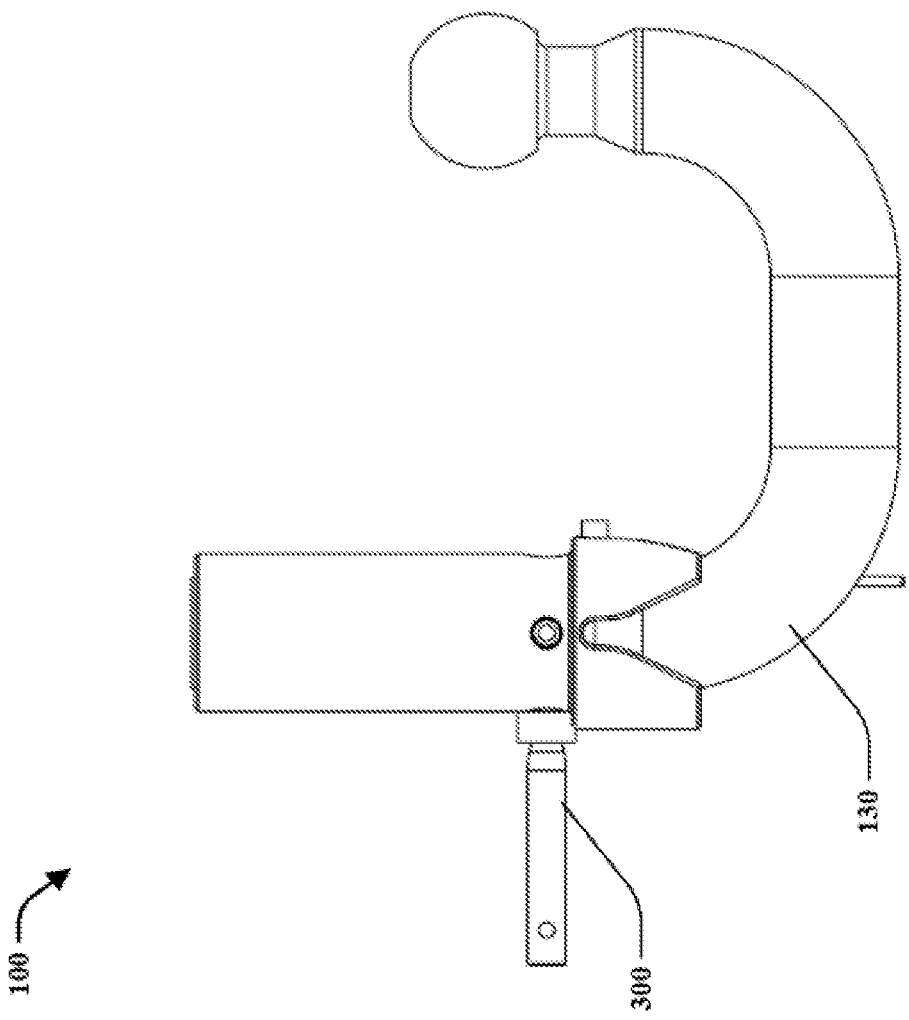
FIG. 11A is a front view of the embodiment of FIG. 1 in a pin-released, towing and fold-away configuration.
Figure 12B:
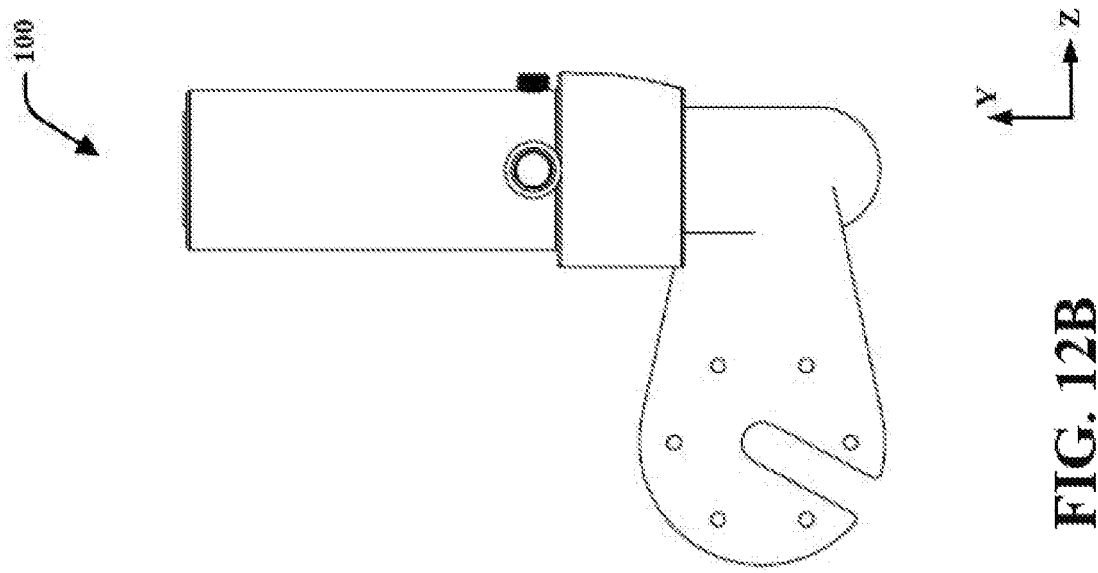
FIG. 12B is a side view of the embodiment of FIG. 1 in the pin-locked, towing and fold-away configuration.
Figure 12A:
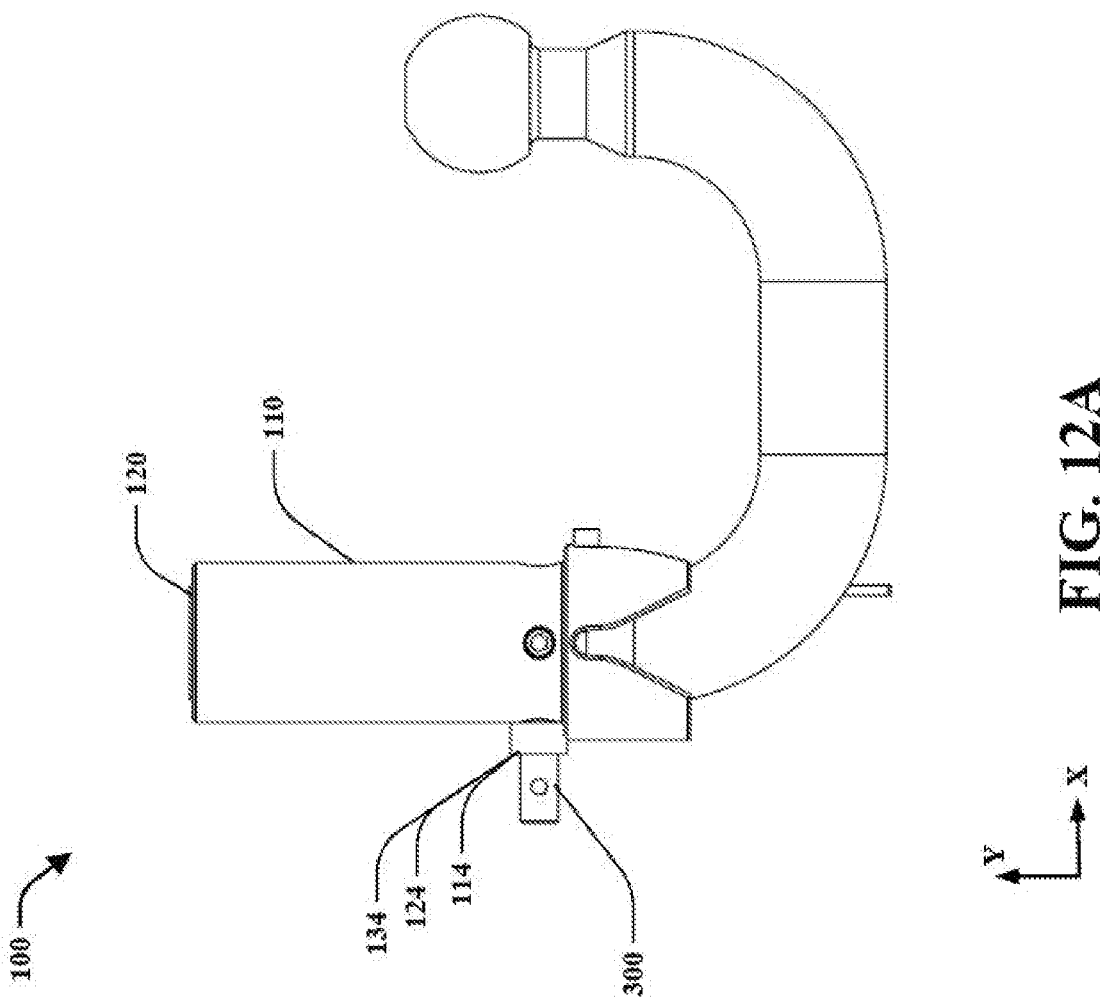
FIG. 12A is a front view of the embodiment of FIG. 1 in a pin-locked, towing and fold-away configuration.
Figure 13:
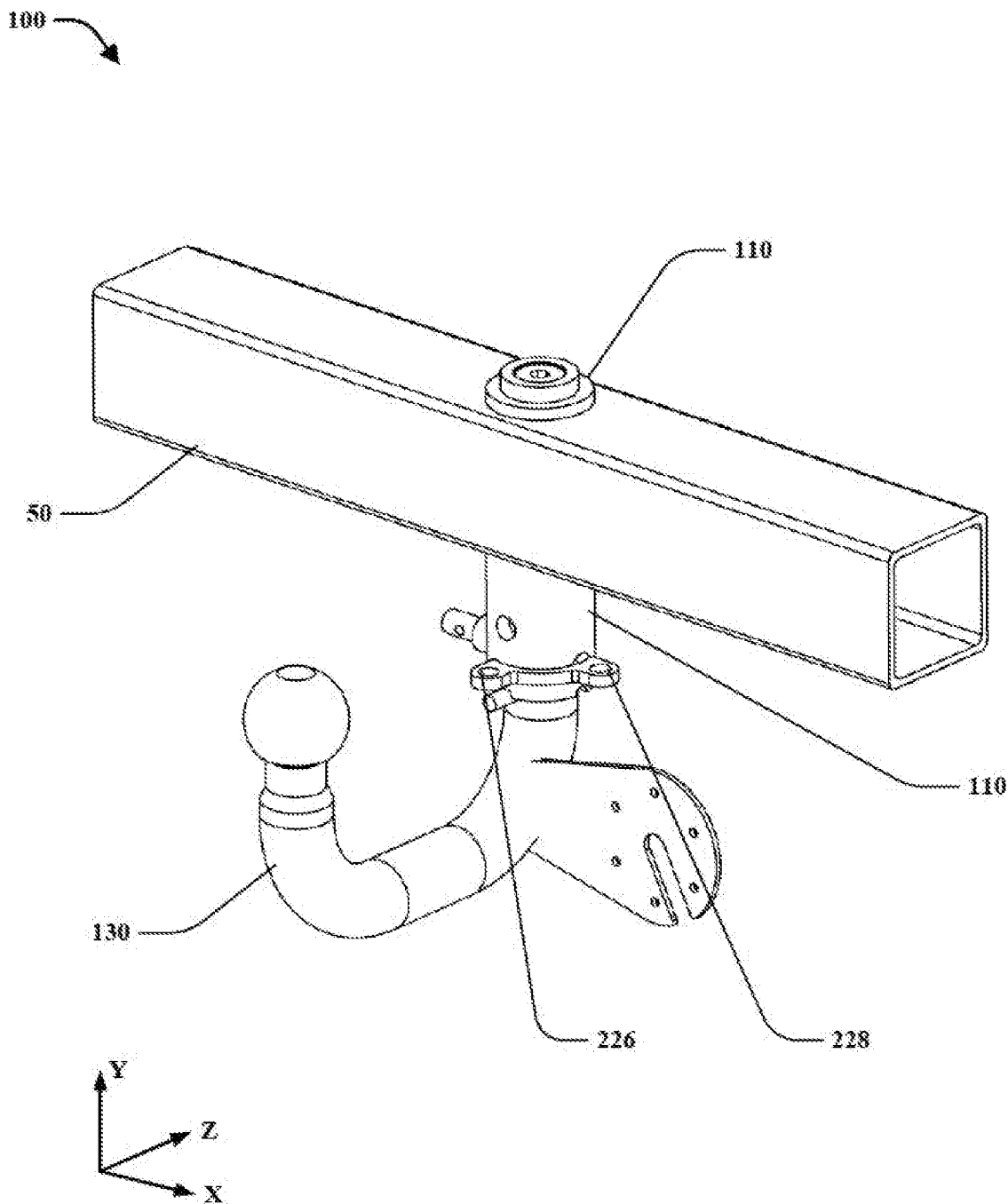
FIG. 13 is a perspective view of alternative embodiment of a towbar with a hitch ball system incorporating brackets in a towing configuration.
Figure 14:
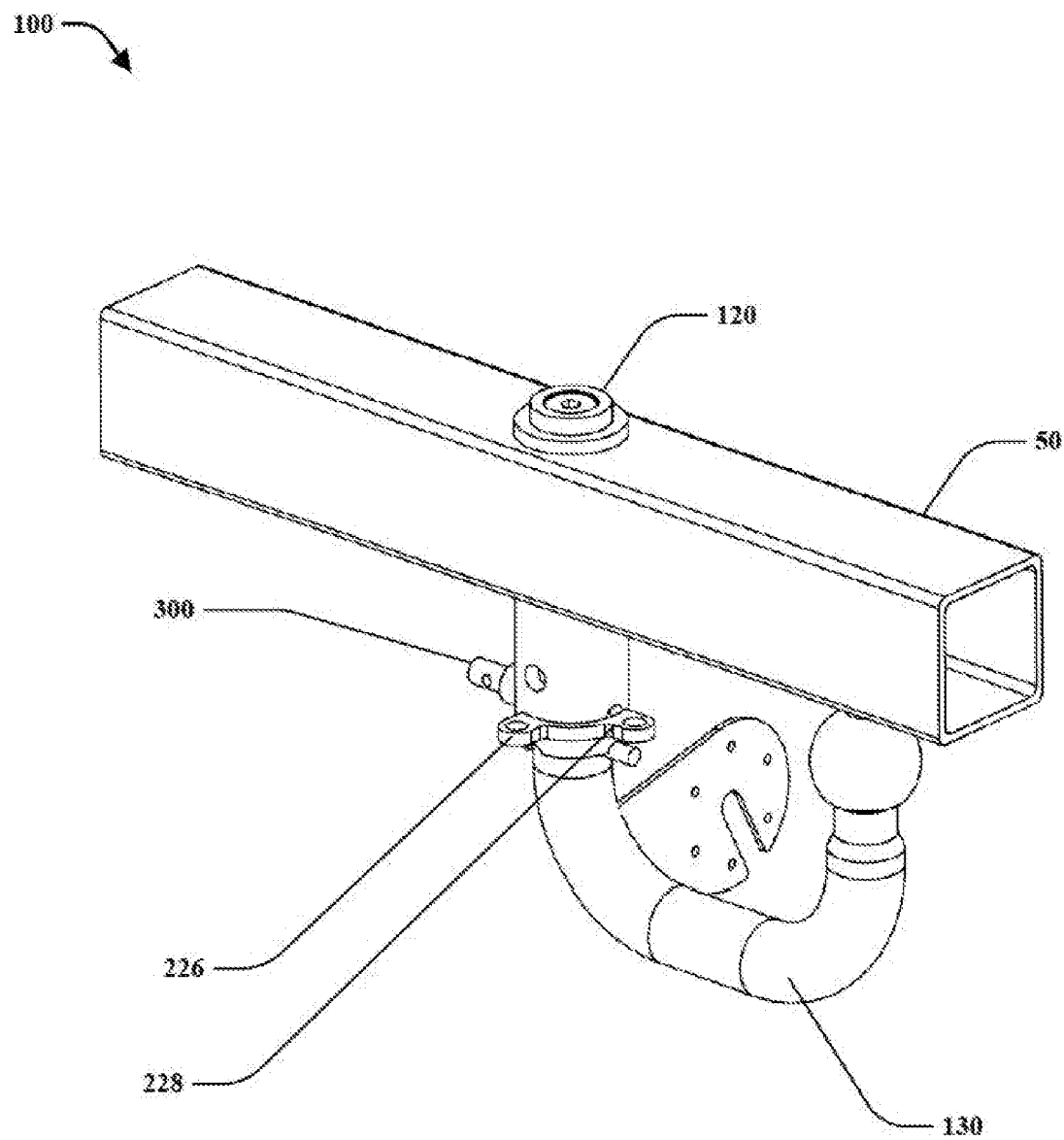
FIG. 14 is a perspective view of the embodiment of FIG. 13 in a fold-away configuration.
Figure 15B:
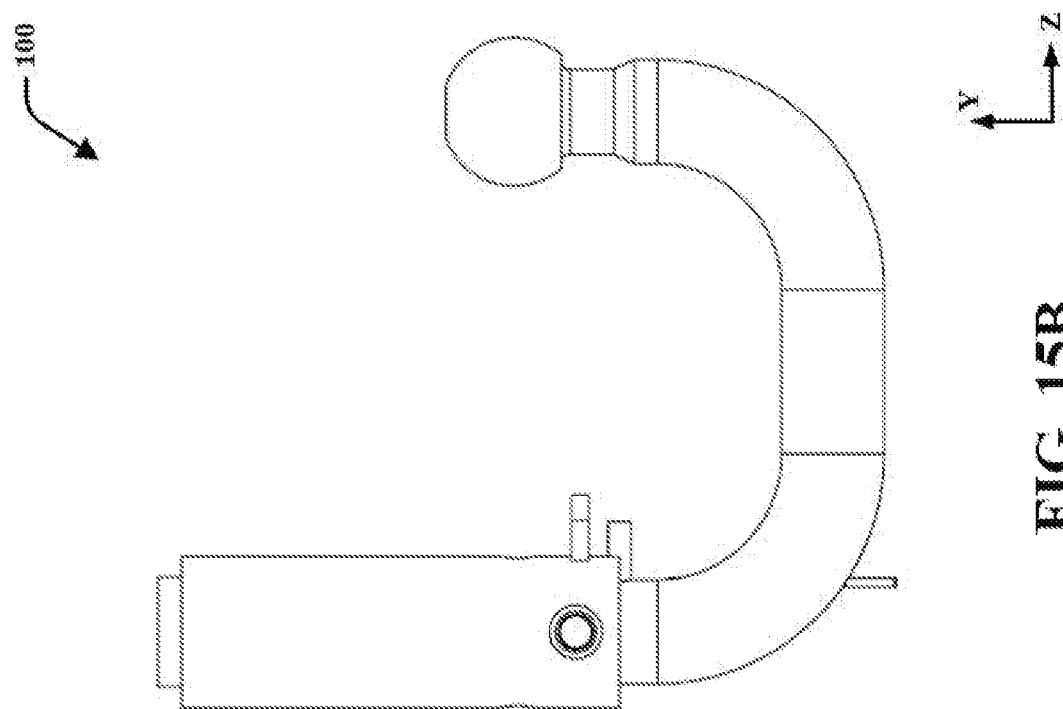
FIG. 15B is a side view of the embodiment of FIG. 13 in the pin-locked towing configuration.
Figure 15A:
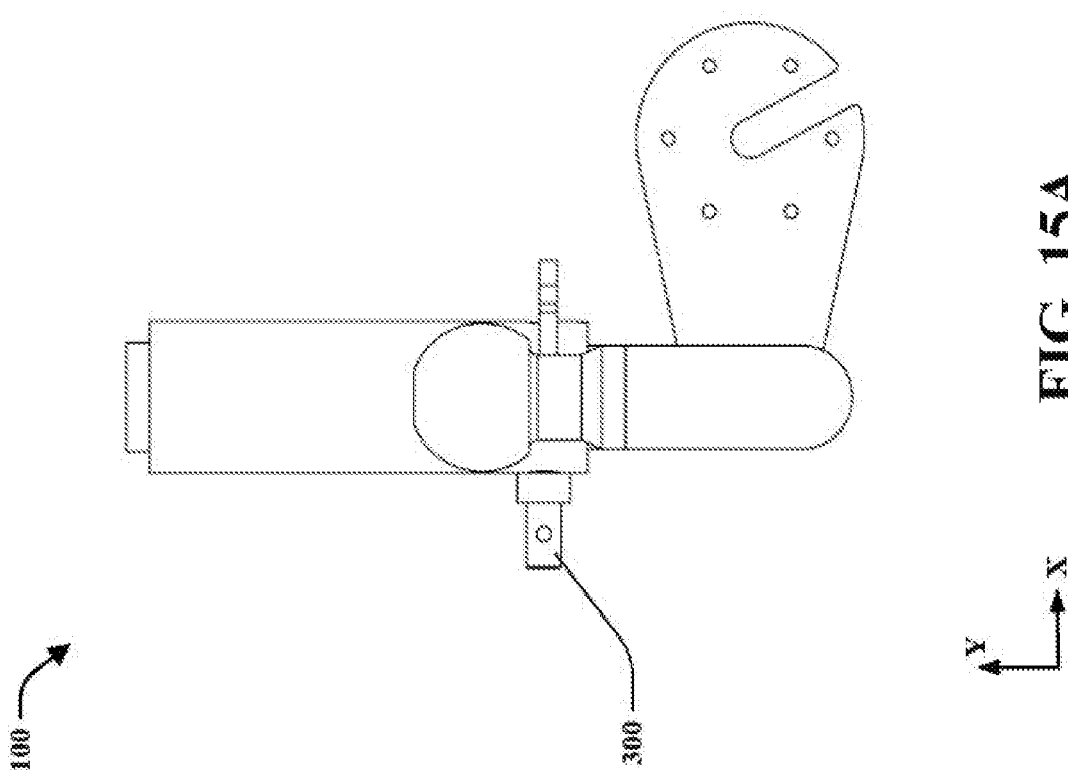
FIG. 15A is a front view of the embodiment of FIG. 13 in a pin-locked towing configuration.
Figure 16B:
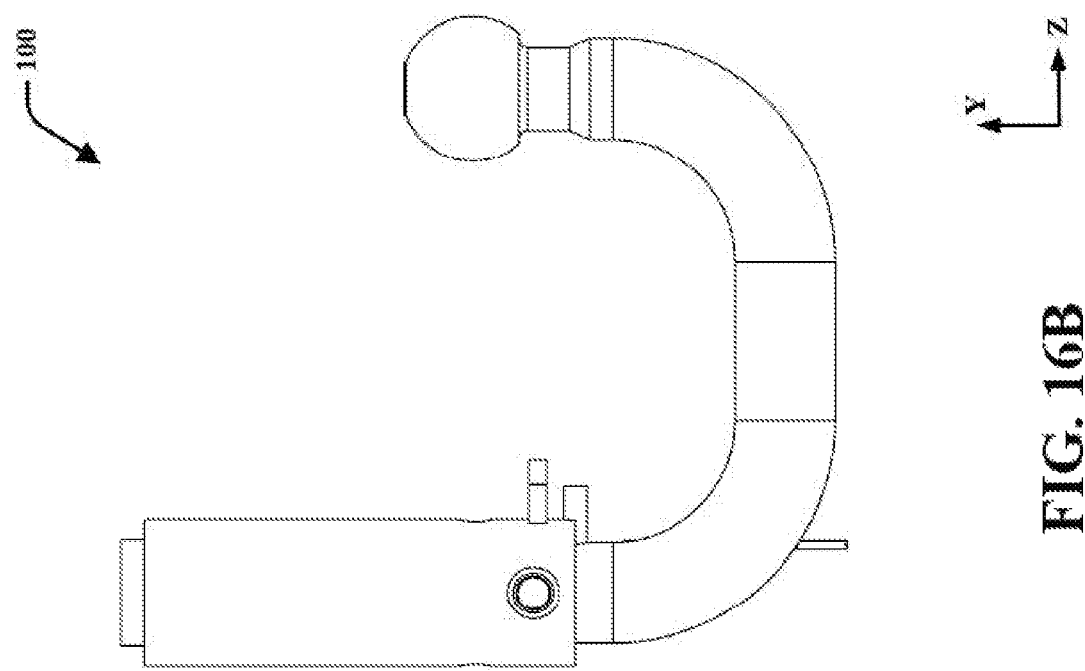
FIG. 16B is a side view of the embodiment of FIG. 13 in the pin-released towing configuration.
Figure 16A:
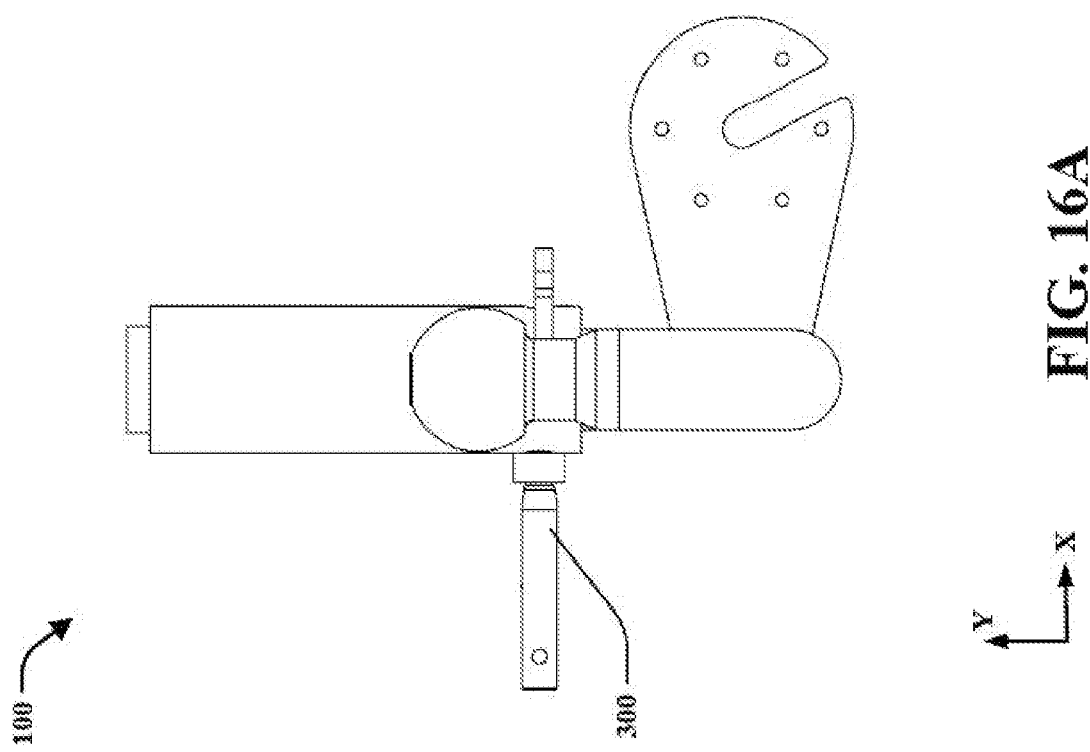
FIG. 16A is a front view of the embodiment of FIG. 13 in a pin-released towing configuration.
Figure 17B:
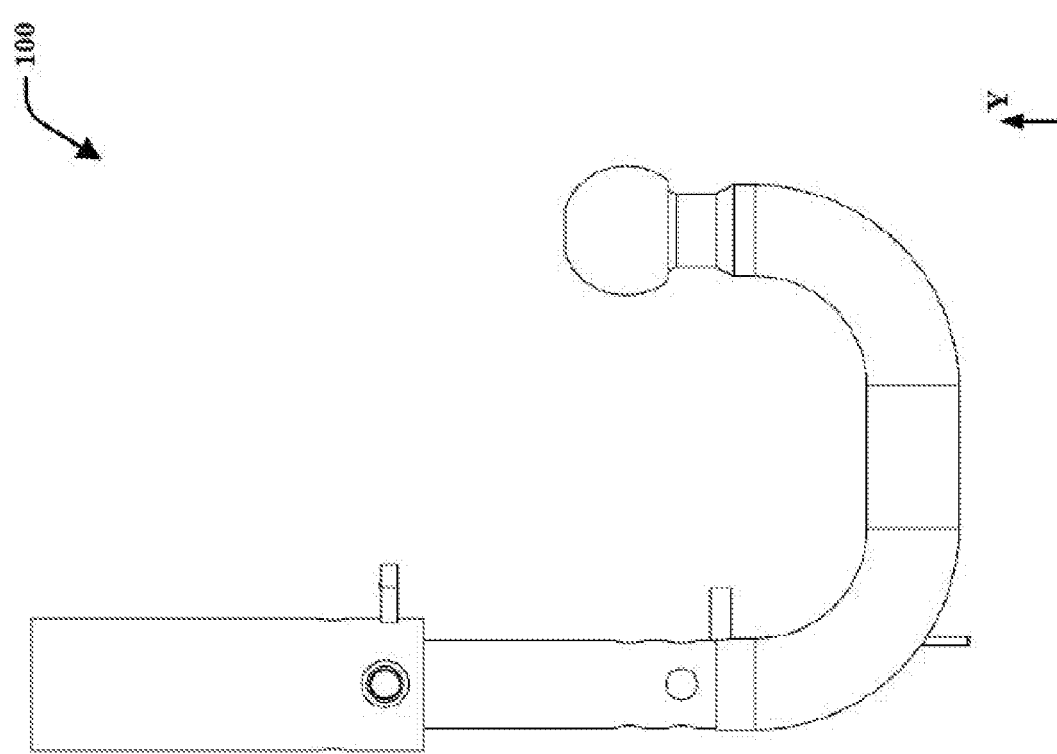
FIG. 17B is a side view of the embodiment of FIG. 13 in the pin-released and dropped configuration.
Figure 17A:
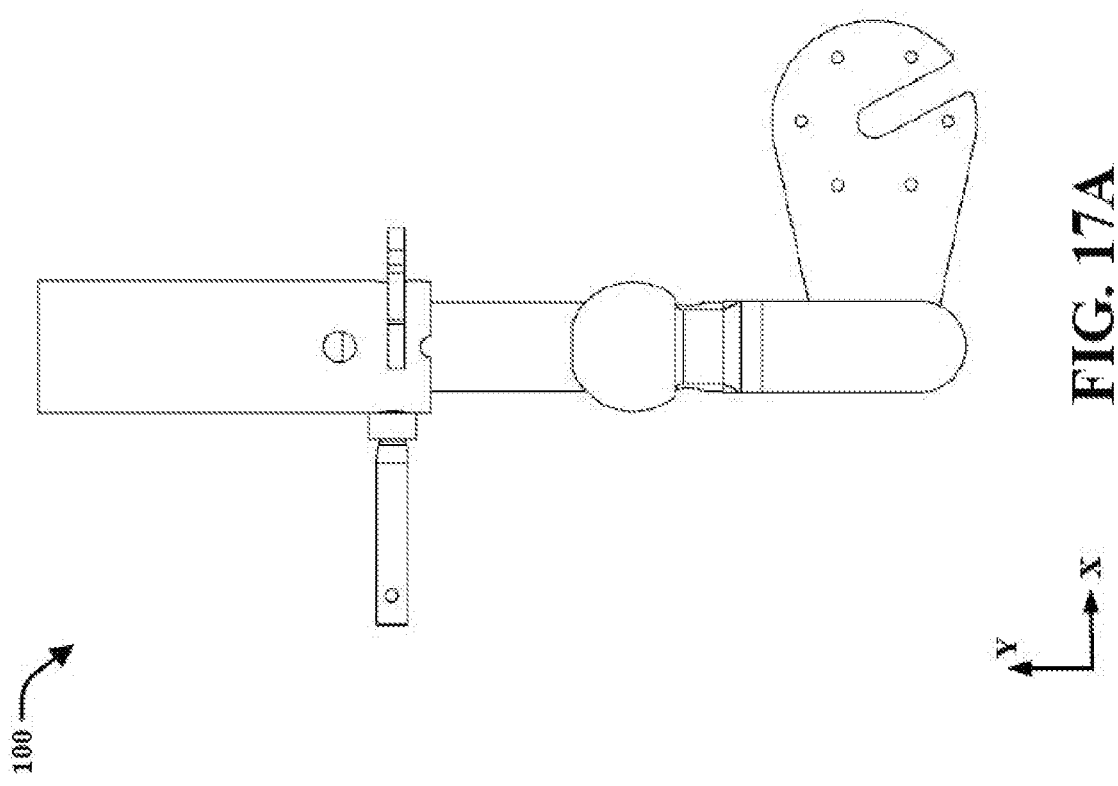
FIG. 17A is a front view of the embodiment of FIG. 13 in a pin-released and dropped configuration.
Figure 18B:
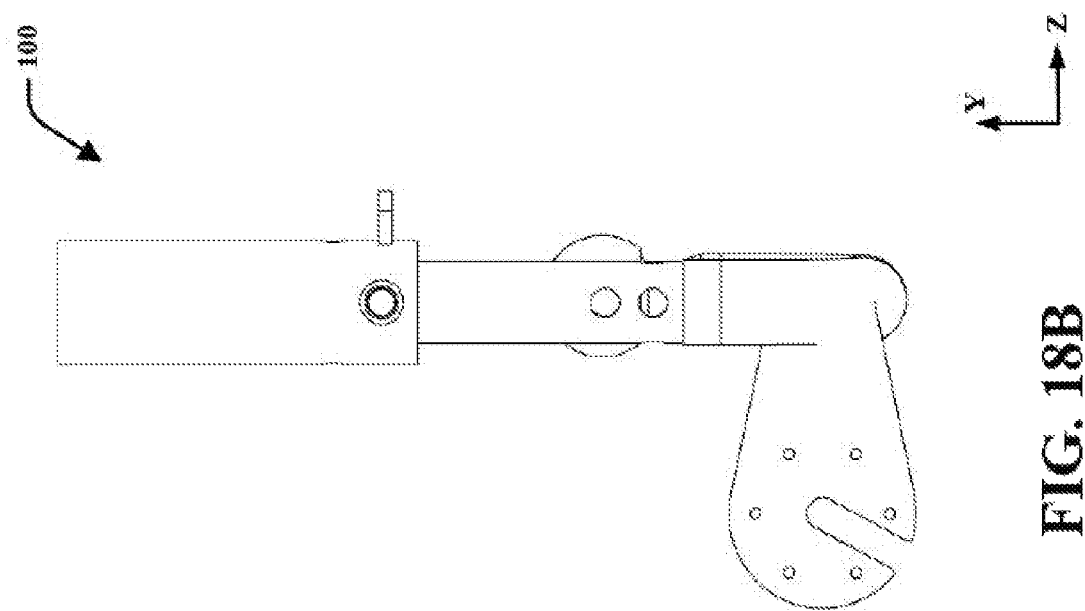
FIG. 18B is a side view of the embodiment of FIG. 13 in the pin-released, dropped and fold-away configuration.
Figure 18A:
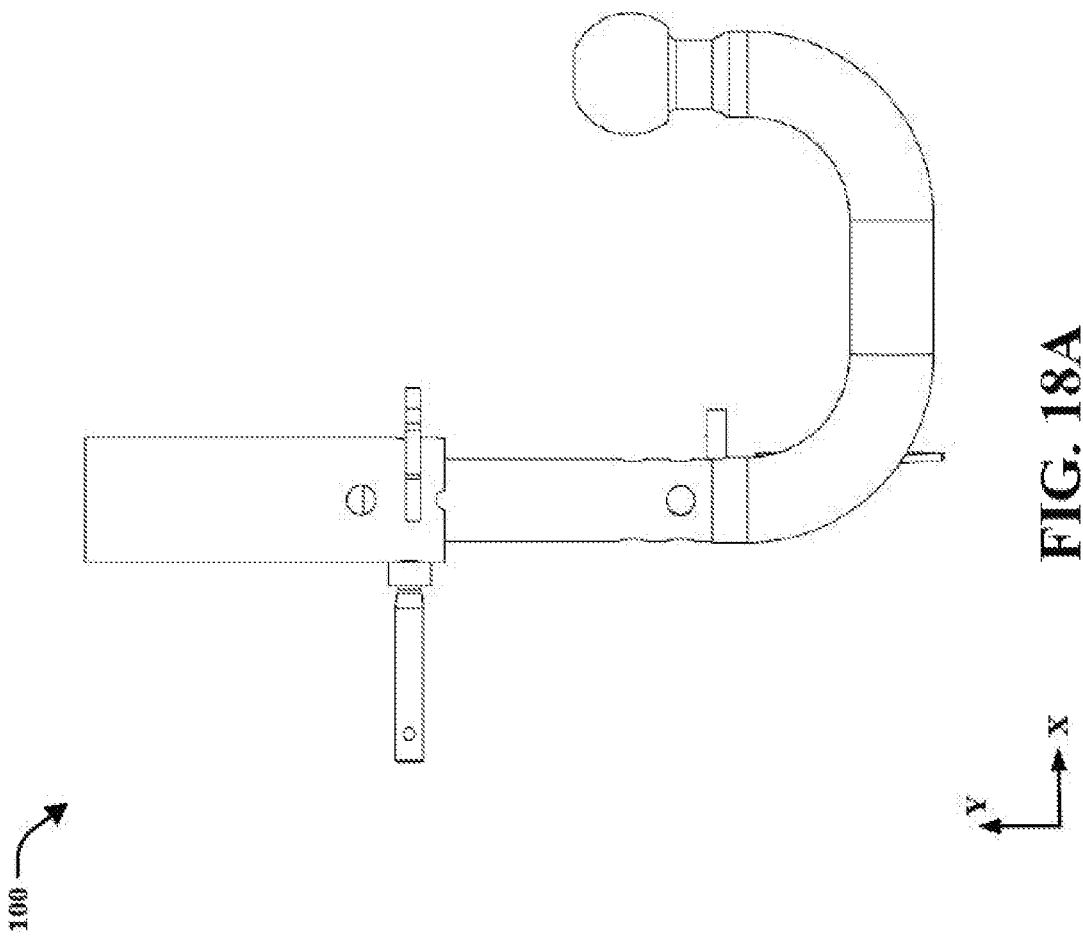
FIG. 18A is a front view of the embodiment of FIG. 13 in a pin-released, dropped and fold-away configuration.
Figure 19B:
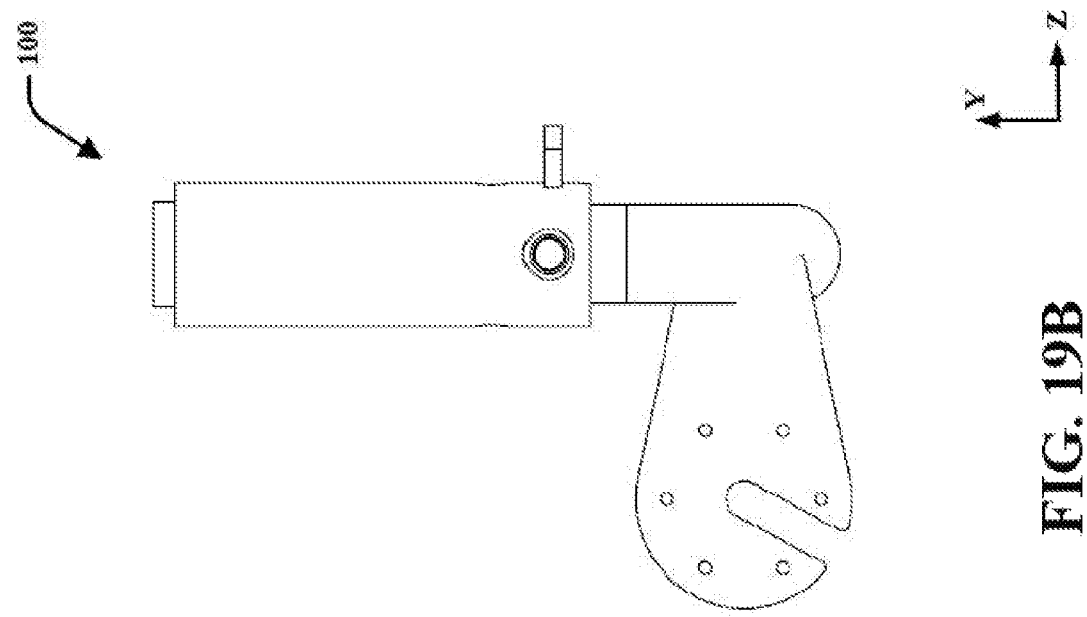
FIG. 19B is a side view of the embodiment of FIG. 13 in the pin-released, towing and fold-away configuration.
Figure 19A:
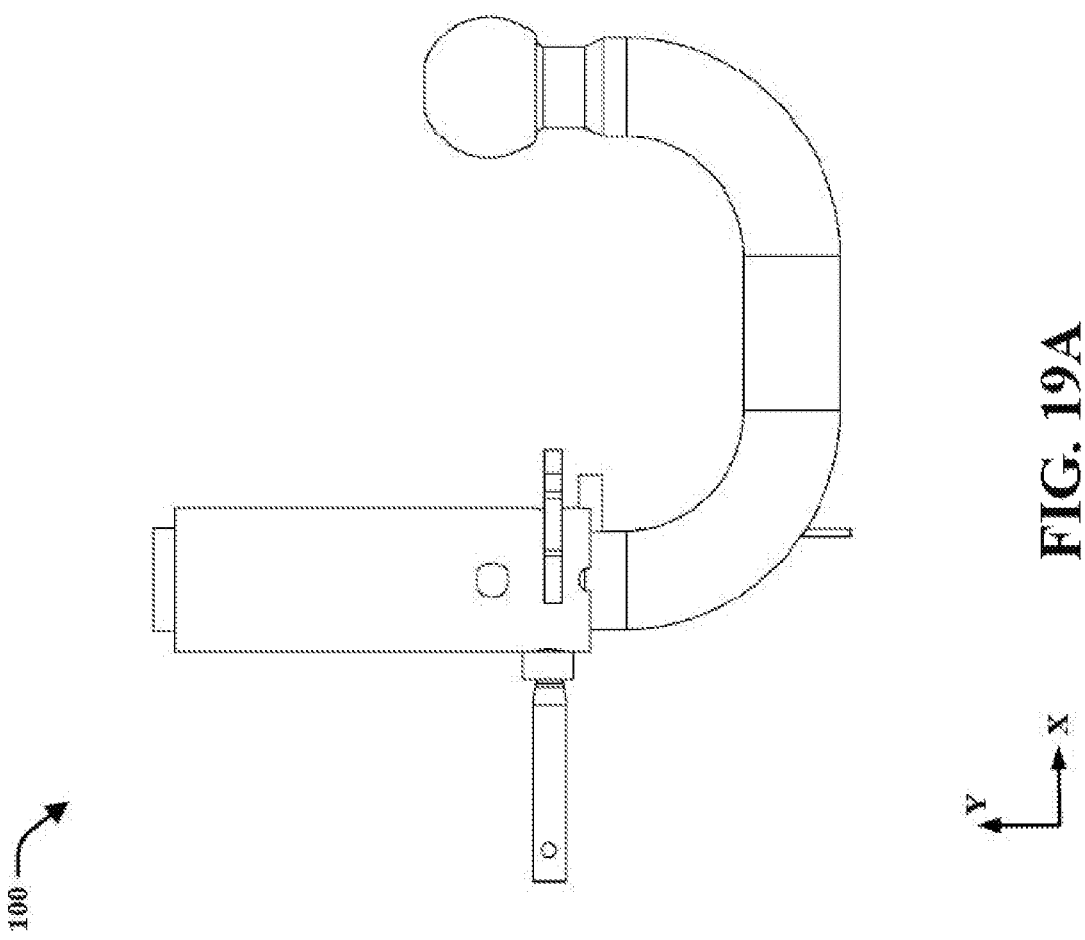
FIG. 19A is a front view of the embodiment of FIG. 13 in a pin-released, towing and fold-away configuration.
Figure 20B:
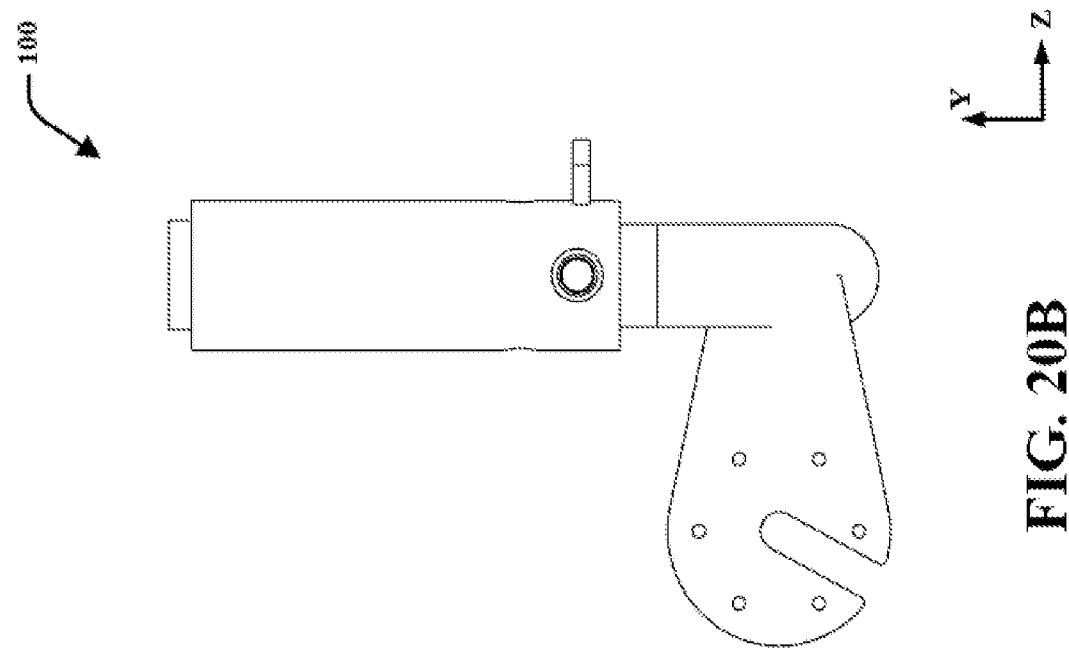
FIG. 20B is a side view of the embodiment of FIG. 13 in the pin-locked, towing and fold-away configuration.
Figure 20A:
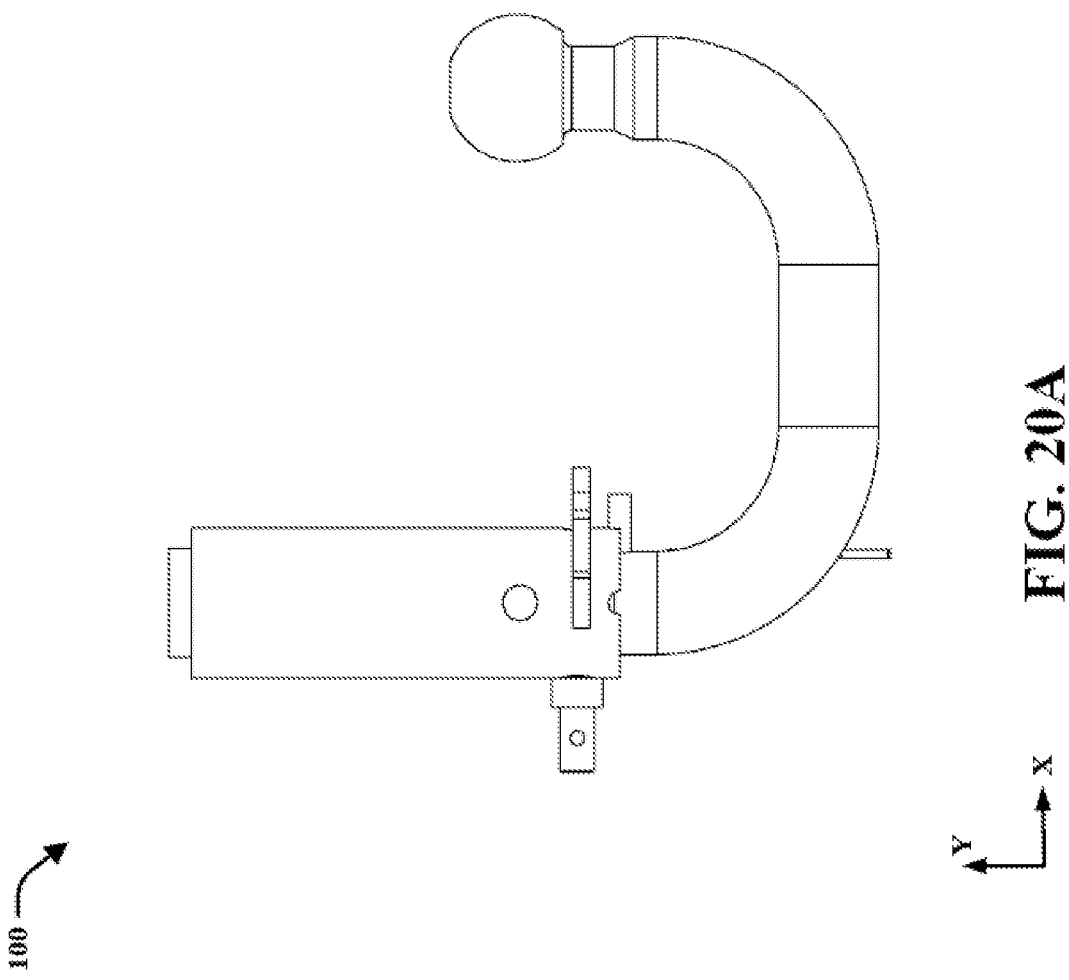
FIG. 20A is a front view of the embodiment of FIG. 13 in a pin-locked, towing and fold-away configuration.

Once the pivoting arm 130 is positioned in the stow-away position with a pin-released, towing and fold-away configuration as shown in FIGS. 11A-11B, the actuating member 310 may be activated by a switch 312 shown in FIG. 5 so that the actuating member 310 may insert the pin member 300 through the apertures 114, 124, 134 of the outer and inner bushings 110, 120 with the pivoting arm 130, as shown in FIGS. 12A and 12B.

Additional embodiments of a towbar with hitch ball system according the present teachings are described below. In the descriptions, all of the details and components may not be fully described or shown. Rather, the features or components are described and, in some instances, differences with the above-described embodiments may be pointed out. Moreover, it should be appreciated that these additional embodiments may include elements or components utilized in the above-described embodiments although not shown or described. Thus, the descriptions of these additional embodiments are merely exemplary and not all-inclusive nor exclusive. Moreover, it should be appreciated that the features, components, elements and functionalities of the various embodiments may be combined or altered to achieve a desired towbar with hitch ball system without departing from the spirit and scope of the present teachings.

Referring to FIGS. 13-20B, provided is another embodiment of the towbar with a hitch ball system 100 incorporating the brackets 226, 228. In these embodiments, there may be no inner bushing 120. Alternatively or in addition, a sensor may be attached in the applicable opening.

It should be understood that while the receiving member is shown and described with the towbar with a hitch ball system 100, any appropriate product may be attached with the towbar with a hitch ball system out departing from the present teachings.

The towbar with a hitch ball system 100 may further include a mechanism (not shown), which may be used in a conventional manner to raise and lower the pivoting arm 130 relative to the outer bushing 110. This may result in the towbar with a hitch ball system 100 being selectively positionable, i.e., extendable and retractable, so that the towbar with a hitch ball system 100 may operate as necessary. In other embodiments, the mechanism may be any other appropriate type of mechanism, such as for example, a topwind crank, generally employing any appropriate gearing mechanism. The present teachings, however, are not limited to a particular gearing mechanism and any appropriate gearing mechanism may be used without departing from the present teachings.

Figure 21:
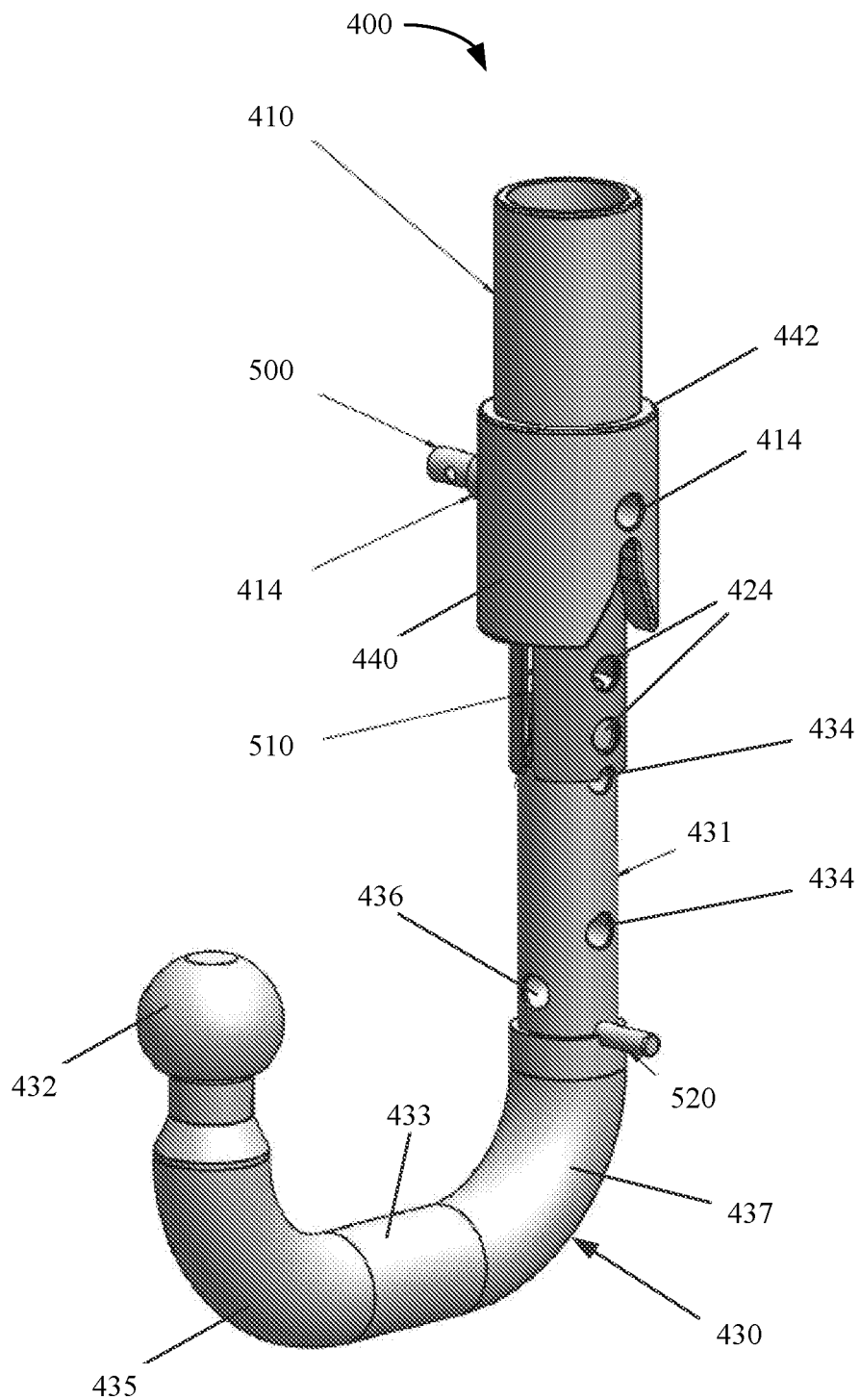
FIG. 21 is a side view of another embodiment of the present invention similar to FIG. 10A showing a slot in the pin-locked, towing and fold-away configuration.

Turning to FIG. 21, another embodiment of a hitch ball system 400 according to the present invention is illustrated where hitch ball system 400 may includes an outer bushing 410, an inner bushing 420, a pivoting arm 430 and a coupler 440. The inner bushing 420 is in a telescoping relationship with or otherwise telescopingly engaged with the outer bushing 410. The pivoting arm 430 is in telescoping relationship with or otherwise telescopingly engaged with the inner bushing 420. By way of a non-limiting example, the inner bushing 420 retracts within or extends from outer bushing 410. Likewise, the pivoting arm 430 retracts within and extends from inner bushing 420. The outer and inner bushings 410 and 420, respectively, may be of any appropriate shape, such as by way of a non-limiting example, a generally round cross-sectional shape. In some embodiments, the outer and inner bushings 410 and 420, respectively, may have a generally square, rectangular or other appropriate shape. The outer and inner bushings 410 and 420, respectively, may be formed from any material, such as metal or plastic, including, without limitation they may be formed of steel.

Referring to FIG. 21, the pivoting arm 430 may include an engaging portion 431, a hitch ball 432, a mid-portion 433 and first and second rounded portions 435 and 437, respectively. The pivoting arm 430 may be of any appropriate shape, such as a general U-shape whereby it may have two ends extending outwardly from the mid-portion 433. By way of a non-limiting example, the pivoting arm 430 may also be a generally round cross-sectional shape. The present teachings, however, are not limited to this configuration. The hitch ball 432 may be monolithically formed therewith. The hitch ball 432 may be of any appropriate shape, such as generally circular, oval, or the like, so as that it may generally add stability to the pivoting arm 430 of the towbar with a hitch ball system 400. The hitch ball 432 may be configured similar to any current hitch ball. The present teachings are not limited to a specific configuration thereof.

The outer bushing 410 and the pivoting arm 430 may be coupled together by the coupler 440. The coupler 440 may be placed over the outer bushing 410. The coupler 440 may include a coupler aperture 442 through which the pivoting arm 430 may operatively pass (or be inserted therein). The coupler aperture 442 may be of a generally round shape and may be of a size that is similar to the size of an outer diameter of the pivoting arm 430. However, the coupler aperture 442 is not limited to being round. It may also be rectangular, square or any other appropriate shape.

The outer bushing 410 may have an outer diameter that is generally similar to the diameter of the coupler aperture 442 of the coupler 440. The outer diameter of the outer bushing 410 may be of a shape and size that it is configured to be insertable within and through the coupler aperture 442 in the coupler 440. The fit between the outer bushing 410 and coupler aperture 442 is generally tight such that the coupler aperture 442 is just large enough to allow the outer bushing 410 to pass therethrough, but not the pivoting arm 430.

The outer bushing 410 may include a pair of outer apertures 414 on opposing sides. The inner bushing 420 may include a pair of inner apertures 424 on opposing sides. The pair of outer apertures 414 may be aligned with a pair of inner apertures 424 of the inner bushing 420 such that the outer apertures 414 may extend through the inner bushing 420. While a pair of apertures 424 is shown, the inner bushing 420 may include more than the pair of inner apertures 424, i.e., any number of such apertures that provides the appropriate amount of adjustability of the towbar with hitch ball system 400.

A plurality of pairs of arm apertures 434 may be positioned along a portion of the length of the pivoting arm 430. Still further, the plurality of pairs of arm apertures 434 may be positioned on any appropriate portion of the inner bushing 430 and are not limited to be on the sides or limited to be opposed one another. The pivoting arm 430 may be selectively positioned relative to the inner bushing 420 such that one of the plurality of pairs of arm apertures 434 of the pivoting arm 430 may generally align with the pair of inner apertures 424 of the inner bushing 420. In such embodiments, the pivoting arm 430 may be telescopingly positioned relative to the inner bushing 420 to generally align the outer and inner apertures 414 and 424 as required to position the pivoting arm 430 appropriately. It should also be understood that any number of arm apertures 434 may be included, such as two, three, four, five, etc. The appropriate number will depend upon the adjustability desired for the towbar with hitch ball system 400, i.e., the more adjustability desired the more arm apertures 434 will be included.

With respect to FIG. 21, the pin member 500 can be manually actuated or can be generally connected with the actuating member 310 (see FIG. 5) such that portions of the pin member 500 may extend out from the actuating member 310 (see FIG. 5). As shown in FIG. 21, the pair of outer apertures 414 may include a diameter $d_1$ (see FIG. 2B) that is generally larger than an outer diameter $d_2$ (see FIG. 2A) of the first portion 302 (see FIG. 5) of the pin member 500 such that the first portion 302 (see FIG. 5) of the pin member 500 may be inserted into and out of the outer aperture 414. Further, the first portion 302 (see FIG. 5) may be of a shape and size such that it is selectively and axially positionable into and out of the apertures 424, 434 of the inner bushing 420 and pivoting arm 430. A second portion 304 (see FIG. 5) of the pin member 500 may extend from the actuating member 310 (see FIG. 5). The second portion 304 (see FIG. 5) may be opposite the first portion 302 (see FIG. 5). The second portion 304 (see FIG. 5) of the pin member 500 may be biased towards an engaged and locked position for securing the pin member 500 into the pin-locked configuration.

Further in FIG. 21, inner bushing 420 has a groove 510 therein to help with guidance. Additionally, hitch ball system 400 can further include a spring plunger (not shown) in one or more of arm apertures 434 to allow for a user to determine and/or chose 90 degree increments and a second pin member 520 (either manually actuated or connected to its own actuating member 310 as explained with reference to pin 500 above). As illustrated in FIG. 21, pivoting arm 430 has a plurality of pairs of first set of arm apertures 434 that are positioned along a portion of the length of the pivoting arm 430 and one or more second sets of apertures 436 that are positioned on pivoting arm 430 in a substantially 90 degree offset from apertures 434.

Figure 22:
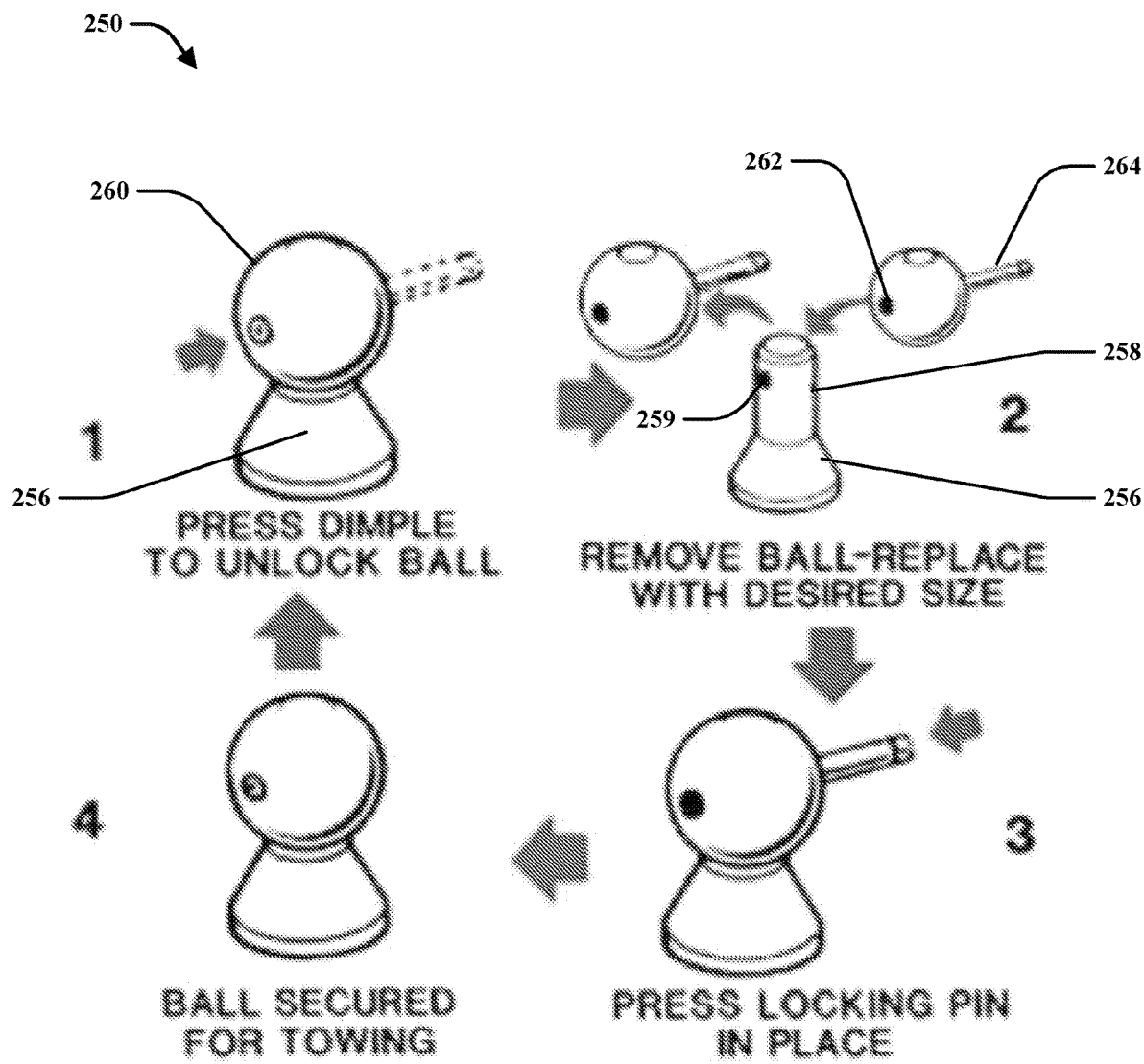
FIG. 22 are perspective views of embodiments of a detachable hitch ball with ball receiving portion in accordance with the present disclosure.

In some embodiments, the hitch ball system 100, 400 may include a removable hitch ball. An exemplary embodiment of a removable hitch ball 260 is depicted in FIG. 22. In such embodiments, the a hitch ball 260 may be selectively secured to a ball-receiving portion 256 of a hitch ball member 250. The hitch ball 260 may further include a ball-locking aperture 262 and a ball-locking pin 264. The hitch ball 260 may be of any appropriate shape, such as generally circular, oval, or the like, so as that it may generally add stability to the hitch ball member 250 of the hitch ball system 400.

The hitch ball 260 may be coupled with the ball-receiving portion 256 by the ball-locking pin 264. The ball-receiving portion 256 may include a ball-receiving aperture 259 through which the ball-locking pin 264 may operatively pass. The ball-receiving aperture 259 may be of a generally round shape and may be of a size that is similar to the size of an outer diameter of the ball-locking pin 264. However, the ball-receiving aperture 259 is not limited to being round. It may also be rectangular, square or any other appropriate shape.

In operation shown in FIG. 22, the ball-locking pin 264 may be selectively engaged with and disengaged from the ball-locking aperture 262 and the ball-receiving aperture 259. The hitch ball 260 may be disengaged from the ball-receiving portion 256 of the hitch ball member 250 so that the user may replace the hitch ball 260 by disengaging the ball-locking pin 264.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

What is claimed is:

1. A hitch ball system comprising:
a first bushing member;
a second bushing member telescopingly engaged with the first bushing member, the second bushing member including at least one aperture;
a pivoting arm telescopingly engaged with the second bushing member; and
an engagement device operatively coupled with the second bushing member, the engagement device including a pin member, wherein the pin member together with the at least one aperture in the second busing member operate to permit different positions of the pivoting arm, wherein the pivoting arm further comprises at least one socket plate, wherein the socket plate is configured to permit the operative coupling of at least one accessory.

2. The hitch ball system of claim 1, wherein the first bushing member has at least one pair of opposing apertures formed therein and the second bushing member has at least one pair of opposing apertures formed therein, wherein the combination of the aperture pairs in the first bushing member and the second busing member together with the pin member permit locking of the first busing member and the second bushing member so as to prohibit any telescoping between the two bushing members.

3. The hitch ball system of claim 1, wherein the hitch ball system is operatively engaged to a towbar, the towbar configured to be attached to at least one type of motor vehicle.

4. The hitch ball system of claim 3, wherein the pivoting arm further comprises at least one socket plate, wherein the socket plate is configured to permit the operative coupling of at least one accessory.

5. The hitch ball system of claim 4, wherein the socket plate is configured to permit the cooperative connection of a female trailer connector plug.

6. The hitch ball system of claim 1, wherein the socket plate is configured to permit the cooperative connection of a female trailer connector plug.

7. The hitch ball system of claim 1, wherein the first bushing member has at least one pair of opposing apertures formed therein, the second bushing member has at least one pair of opposing apertures formed therein and the pivoting arm has at least one pair of opposing apertures formed therein, wherein the combination of the aperture pairs in the first bushing member, the second busing member and the pivoting arm together with the pin member permit locking of the first busing member, the second bushing member and the pivoting arm so as to prohibit any telescoping between all of the busing members and the pivoting arm of the hitch ball system.

8. The hitch ball system of claim 7, wherein the hitch ball system is operatively engaged to a towbar, the towbar configured to be attached to at least one type of motor vehicle.

9. The hitch ball system of claim 8, wherein the pivoting arm further comprises at least one socket plate, wherein the socket plate is configured to permit the operative coupling of at least one accessory.

10. A hitch ball system comprising:
a inner bushing member;
an outer bushing member telescopingly engaged with the first bushing member;
a coupler operatively connected to the outer busing member, the coupler including at least two apertures formed therein;
a pivoting arm telescopingly engaged with the coupler; and
an engagement device operatively coupled with the coupler, the engagement device including a pin member, wherein the pin member together with the at least two apertures in the coupler operate to permit different positions of the pivoting arm, wherein the inner bushing member has at least one pair of opposing apertures formed therein and the outer bushing member has at least one pair of opposing apertures formed therein, wherein the combination of the aperture pairs in the inner bushing member and the outer busing member together with the pin member permit locking of the inner bushing member and the outer bushing member so as to prohibit any telescoping between the inner and outer bushing member.

11. The hitch ball system of claim 10, wherein the hitch ball system is operatively engaged to a towbar, the towbar configured to be attached to at least one type of motor vehicle.

12. The hitch ball system of claim 11, wherein the pivoting arm further comprises at least one socket plate, wherein the socket plate is configured to permit the operative coupling of at least one accessory.

13. The hitch ball system of claim 12, wherein the socket plate is configured to permit the cooperative connection of a female trailer connector plug.

14. The hitch ball system of claim 10, wherein the pivoting arm further comprises at least one socket plate, wherein the socket plate is configured to permit the operative coupling of at least one accessory.

15. The hitch ball system of claim 14, wherein the socket plate is configured to permit the cooperative connection of a female trailer connector plug.

16. The hitch ball system of claim 10, wherein the pivoting arm has at least one pair of opposing apertures formed therein, wherein the combination of the aperture pairs in the inner bushing member, the outer bushing member and the pivoting arm together with the pin member permit locking of the inner bushing member, the outer bushing member and the pivoting arm so as to prohibit any telescoping between all of the bushing members and the pivoting arm of the hitch ball system.

17. The hitch ball system of claim 16, wherein the hitch ball system is operatively engaged to a towbar, the towbar configured to be attached to at least one type of motor vehicle.

18. The hitch ball system of claim 17, wherein the pivoting arm further comprises at least one socket plate, wherein the socket plate is configured to permit the operative coupling of at least one accessory.

19. A hitch ball system comprising:
a inner bushing member;
an outer bushing member telescopingly engaged with the first bushing member, the second bushing member including at least one aperture;
a pivoting arm telescopingly engaged with the second bushing member; and
an engagement device operatively coupled with the second bushing member, the engagement device including a pin member and an electrically-operating device, wherein the electrically-operating device generally aligns the pin member with the at least one aperture of the second bushing member, wherein the inner bushing member has at least one pair of opposing apertures formed therein and the outer bushing member has at least one pair of opposing apertures formed therein, wherein the combination of the aperture pairs in the inner bushing member and the outer bushing member together with the pin member permit locking of the inner bushing member and the outer bushing member so as to prohibit any telescoping between the inner and outer bushing members.

20. The hitch ball system of claim 19, wherein the hitch ball system is operatively engaged to a towbar, the towbar configured to be attached to at least one type of motor vehicle.

21. The hitch ball system of claim 20, wherein the pivoting arm further comprises at least one socket plate, wherein the socket plate is configured to permit the operative coupling of at least one accessory.

22. The hitch ball system of claim 21, wherein the socket plate is configured to permit the cooperative connection of a female trailer connector plug.

23. The hitch ball system of claim 19, wherein the pivoting arm further comprises at least one socket plate, wherein the socket plate is configured to permit the operative coupling of at least one accessory.

24. The hitch ball system of claim 23, wherein the socket plate is configured to permit the cooperative connection of a female trailer connector plug.

25. The hitch ball system of claim 19, wherein the pivoting arm has at least one pair of opposing apertures formed therein, wherein the combination of the aperture pairs in the inner bushing member, the outer bushing member and the pivoting arm together with the pin member permit locking of the inner bushing member, the outer bushing member and the pivoting arm so as to prohibit any telescoping between all of the bushing members and the pivoting arm of the hitch ball system.

26. The hitch ball system of claim 25, wherein the hitch ball system is operatively engaged to a towbar, the towbar configured to be attached to at least one type of motor vehicle.

27. The hitch ball system of claim 26, wherein the pivoting arm further comprises at least one socket plate, wherein the socket plate is configured to permit the operative coupling of at least one accessory.

28. The hitch ball system of claim 19, wherein the pivoting arm further comprises a detachable hitch ball, wherein the detachable hitch ball is removably attached to the pivoting arm via at least one engagement pin configured to engage at least one aperture of the detachable hitch ball.

* * * * *